US012808734B2

(12) United States Patent
Jaaskelainen et al.

(10) Patent No.: US 12,808,734 B2
(45) Date of Patent: Nov. 24, 2026

(54) EXTENDING FIBER OPTIC SENSING

(71) Applicant: Halliburton Energy Services, Inc., Houston, TX (US)

(72) Inventors: Mikko K Jaaskelainen, Houston, TX (US); Andreas Ellmauthaler, Houston, TX (US); Ira Jeffrey Bush, Los Angeles, CA (US); John Laureto Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 183 days.

(21) Appl. No.: 17/693,578

(22) Filed: Mar. 14, 2022

(65) Prior Publication Data

US 2022/0412821 A1 Dec. 29, 2022

Related U.S. Application Data

(60) Provisional application No. 63/215,712, filed on Jun. 28, 2021.

(51) Int. Cl.

*G01L 1/24* (2006.01)
*E21B 47/06* (2012.01)

(Continued)

(52) U.S. Cl.

CPC .............. *G01L 1/246* (2013.01); *E21B 47/06* (2013.01); *E21B 47/07* (2020.05); *E21B 47/113* (2020.05);

(Continued)

(58) Field of Classification Search

None

See application file for complete search history.

(56) References Cited

U.S. PATENT DOCUMENTS 6,874,361 B1 * 4/2005 Meltz ...................... E21B 43/14 73/152.32
6,933,491 B2 8/2005 Maida, Jr.

(Continued)

FOREIGN PATENT DOCUMENTS

CN 110673202 A 1/2020
CN 111308547 A 6/2020

(Continued)

OTHER PUBLICATIONS

The International Society for Optics and Photonics, "UV direct writing of planar waveguides: basics and applications," Gates, et al., Aug. 12, 2013, https://spie.org/news/5036-uv-direct-writing-of-planar-waveguides-basics-and-applications#_=_ (Year: 2013).*

(Continued)

*Primary Examiner* — Kara E. Geisel
*Assistant Examiner* — Chad Andrew Reverman
(74) *Attorney, Agent, or Firm* — Scott Richardson; C. Tumey Law Group, PLLC

(57) ABSTRACT

A system for downhole measurements. The system may comprise a fiber optic cable that further comprises a transmission fiber and a return fiber. Additionally, the system may comprise a passive optical device optically connected to the transmission fiber and the return fiber, a first wavelength division multiplexer (WDM) optically connected to the transmission fiber, and a second WDM optically connected to the return fiber. The system may further comprise a transmitter and a first Raman pump optically connected to the first WDM and a receiver and a second Raman pump optically connected to the second WDM.

14 Claims, 20 Drawing Sheets

(51) Int. Cl.

| | |
|---|---|
| ***E21B 47/07*** | (2012.01) |
| ***E21B 47/113*** | (2012.01) |
| ***E21B 47/135*** | (2012.01) |
| ***G01K 11/3206*** | (2021.01) |
| ***G01K 11/322*** | (2021.01) |
| ***G01K 11/324*** | (2021.01) |
| ***G01M 5/00*** | (2006.01) |
| ***G01V 1/40*** | (2006.01) |

(52) U.S. Cl.

CPC ........ *E21B 47/135* (2020.05); *G01K 11/3206* (2013.01); *G01K 11/322* (2021.01); *G01K 11/324* (2021.01); *G01M 5/0091* (2013.01); *G01V 1/40* (2013.01)

(56) References Cited

U.S. PATENT DOCUMENTS

| | | | | |
|---|---|---|---|---|
| 2004/0113104 | A1* | 6/2004 | Maida, Jr. .......... | H04B 10/2589 250/573 |
| 2005/0191008 | A1* | 9/2005 | Anson .................. | G01C 19/721 385/39 |
| 2009/0056447 | A1 | 3/2009 | Berthold et al. | |
| 2010/0313658 | A1 | 12/2010 | Andersen et al. | |
| 2011/0277548 | A1 | 11/2011 | Andersen et al. | |
| 2012/0216615 | A1 | 8/2012 | Andersen et al. | |
| 2013/0070235 | A1* | 3/2013 | Chen ..................... | G01L 11/025 356/73.1 |
| 2013/0209029 | A1 | 8/2013 | Mitchell et al. | |
| 2014/0139226 | A1 | 5/2014 | Jaaskelainen et al. | |
| 2014/0152995 | A1* | 6/2014 | Dong ................. | G01D 5/35316 356/477 |
| 2014/0260588 | A1 | 9/2014 | Jaaskelainen et al. | |
| 2015/0369954 | A1 | 12/2015 | Jaaskelainen et al. | |
| 2017/0183959 | A1 | 6/2017 | Ellmauthaler et al. | |
| 2017/0235006 | A1 | 8/2017 | Ellmauthaler et al. | |
| 2017/0268944 | A1 | 9/2017 | Nunes et al. | |
| 2018/0058196 | A1 | 3/2018 | Jaaskelainen et al. | |
| 2019/0204192 | A1 | 7/2019 | Jaaskelainen et al. | |
| 2019/0211671 | A1 | 7/2019 | Skinner et al. | |
| 2019/0293894 | A1 | 9/2019 | Benjamin et al. | |
| 2019/0301278 | A1 | 10/2019 | Jaaskelainen et al. | |
| 2019/0353029 | A1 | 11/2019 | Barfoot et al. | |
| 2020/0032645 | A1 | 1/2020 | LeBlanc et al. | |
| 2020/0116883 | A1 | 4/2020 | Padhi et al. | |
| 2020/0131900 | A1 | 4/2020 | Leblanc et al. | |
| 2020/0182043 | A1 | 6/2020 | Downey et al. | |
| 2020/0271811 | A1 | 8/2020 | Wilson et al. | |
| 2020/0362692 | A1 | 11/2020 | Ellmauthaler et al. | |
| 2021/0011185 | A1 | 1/2021 | Willis et al. | |
| 2021/0096020 | A1 | 4/2021 | Stark et al. | |
| 2021/0131276 | A1 | 5/2021 | LeBlanc et al. | |
| 2021/0199825 | A1 | 7/2021 | LeBlanc et al. | |
| 2021/0199832 | A1 | 7/2021 | Wu et al. | |
| 2021/0239549 | A1 | 8/2021 | Maida et al. | |
| 2021/0270131 | A1 | 9/2021 | Ellmauthaler et al. | |
| 2021/0270667 | A1 | 9/2021 | Ellmauthaler et al. | |
| 2021/0301653 | A1 | 9/2021 | Jaaskelainen et al. | |
| 2021/0372213 | A1 | 12/2021 | Park et al. | |
| 2021/0405231 | A1 | 12/2021 | Wu et al. | |
| 2022/0049587 | A1 | 2/2022 | Park et al. | |
| 2023/0221151 | A1* | 7/2023 | Farhadiroushan .... | E21B 47/114 |

FOREIGN PATENT DOCUMENTS

| | | | | |
|---|---|---|---|---|
| WO | WO-03065619 A2 * | 8/2003 | ......... | G01D 5/35364 |
| WO | 2005-083355 | 9/2005 | | |
| WO | WO-2021165700 A1 * | 8/2021 | ............. | E21B 47/06 |

OTHER PUBLICATIONS

Wikipedia, "Brillouin scattering," Date of Page Mar. 19, 2021, https://en.wikipedia.org/w/index.php?title=Brillouin_scattering&oldid=1013021319 (Year: 2021).*

Silixa, "Process flow metering," Internet Archive date May 13, 2021, https://web.archive.org/web/20210513011045/https://silixa.com/sectors/mining/process-flow-metering/ (Year: 2021).*

Agiltron, "Fused Couplers/Splitters," Internet Archive Copy Dated Sep. 28, 2020, https://agiltron.com/category/fiber-optical-splitter-coupler/fused-couplers-filters-splitters-wdms-combiners/ (Year: 2020).*

International Search Report and Written Opinion for Application No. PCT/US2022/022292, dated Jul. 8, 2022.

United Kingdom Office Action for GB Patent Application No. 2518742.8 dated Dec. 10, 2025. PDF file. 4 pages.

* cited by examiner

EXTENDING FIBER OPTIC SENSING

BACKGROUND

Boreholes drilled into subterranean formations may enable recovery of desirable fluids (e.g., hydrocarbons) using a number of different techniques. A number of systems and techniques may be employed in subterranean operations to determine borehole and/or formation properties. For example, Distributed Acoustic Sensing (DAS) along with a fiber optic system may be utilized together to determine borehole and/or formation properties. Distributed fiber optic sensing is a cost-effective method of obtaining real-time, high-resolution, highly accurate temperature and strain (acoustic) data along the entire wellbore. In examples, discrete sensors, e.g., for sensing pressure and temperature, may be deployed in conjunction with the fiber optic cable. Additionally, distributed fiber optic sensing may eliminate downhole electronic complexity by shifting all electro-optical complexity to the surface within the interrogator unit. Fiber optic cables may be permanently deployed in a wellbore via single- or dual-trip completion strings, behind casing, on tubing, or in pumped down installations; or temporally via coiled tubing slickline, or disposable cables.

Distributed sensing is enabled by continuously sensing along the length of the fiber, and effectively assigning discrete measurements to a position along the length of the fiber via optical time-domain reflectometry (OTDR) and/or Optical Frequency Domain Reflectometry (OFDR). That is, knowing the velocity of light in fiber, and by measuring the time it takes the backscattered light to return to the detector inside the interrogator, it is possible to assign a distance along the fiber.

Distributed acoustic sensing has long been practiced for dry-tree wells, however, has only recently been attempted in wet-tree (or subsea) wells, to enable intervention less, time-lapse reservoir monitoring via vertical seismic profiling (VSP), well integrity, flow assurance, and sand control. A subsea operation utilizes optical engineering solutions to compensate for losses accumulated through long (~5 to 100 km) lengths of subsea transmission fiber, 10 km of in—well subsurface fiber, and multiple wet- and dry-mate optical connectors, splices, and optical feedthrough systems (OFS).

For example, there may be a number of applications where the well head may be at a significant distance from surface processing equipment, separators, tanks, instrument room etc. Examples comprise subsea wet trees supported by platforms or FPSO's, wells spaced out in remote areas where flow lines may be trenched/buried and then routed to a central control and/or processing facility. It would be prohibitively expensive or impossible to build dedicated control rooms or marinize fiber optic equipment to enable fiber optic sensing deployment in scale.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates generally to a system and method for using fiber optics in a DAS system in a subsea operation. Subsea operations may present optical challenges which may relate to the quality of the overall signal in the DAS system with a longer fiber optical cable. Additionally, systems and methods that utilize fiber optics aim to reduce the footprint of remote and/or subsea operations while enabling sensing and control to these wells and reservoirs. Subsea applications and operations in harsh but environmentally sensitive areas like the arctic utilize remote monitoring and control—both for production optimization but also to ensure environmentally sound and safe operations.

Subsea DAS systems may be used for a number of different applications, including flow monitoring, leak detection, injection monitoring of water/gas/CO2, gas lift monitoring, subsurface integrity monitoring, Vertical Seismic Profiling (VSP), 4D seismic, DAS MSM (micro-seismic), cap rock monitoring, and/or the like. The same technology and approach can be applied when disposing of CO2 into remote subsurface reservoirs for permanent storage.

Figure 1:
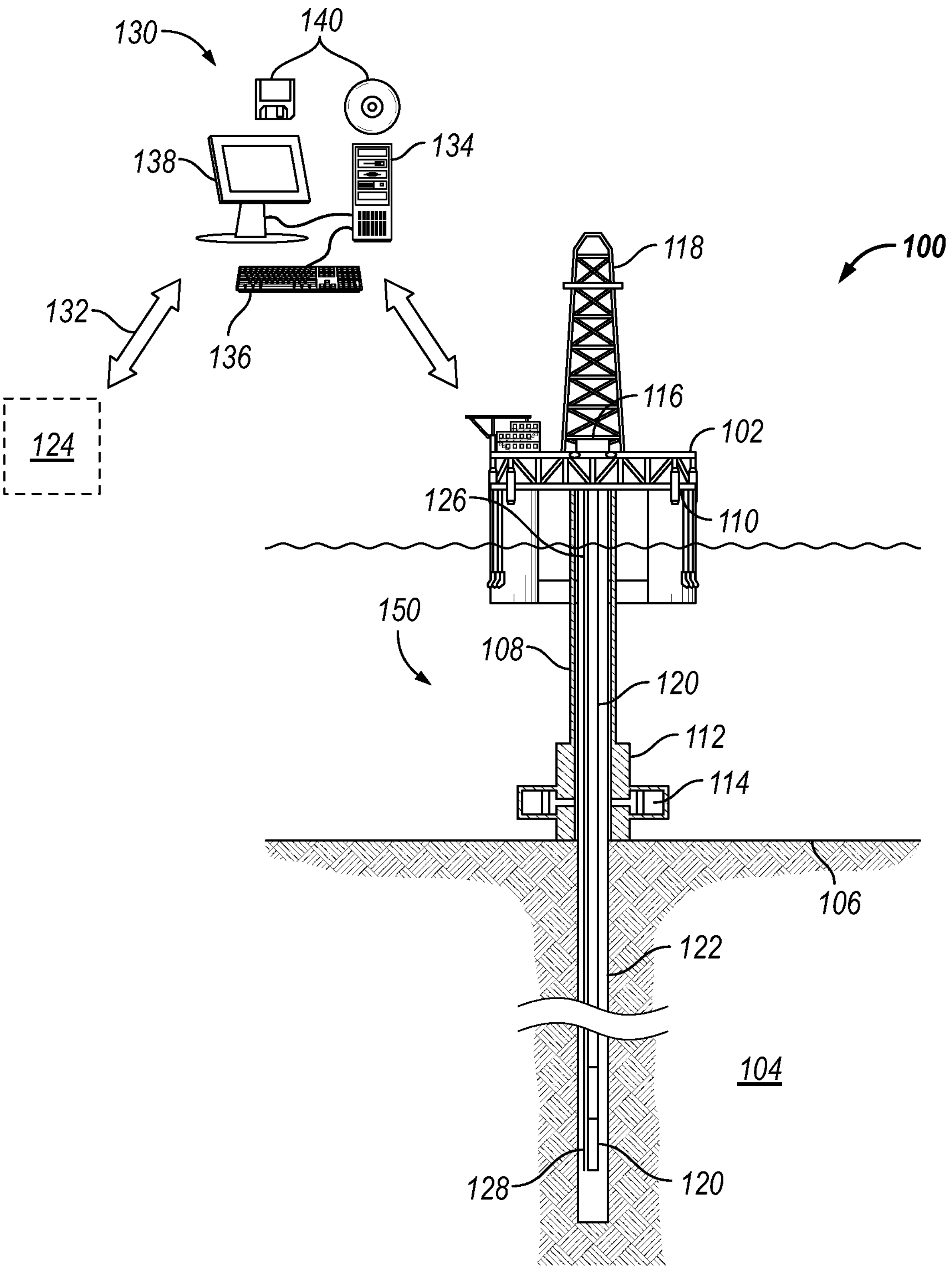
FIG. 1 illustrate an example of a well measurement system in a subsea environment.

FIG. 1 illustrates a well system 100 that may employ the principles of the present disclosure. More particularly, well system 100 may comprise a floating vessel 102 centered over a subterranean hydrocarbon bearing formation 104 located below a sea floor 106. As illustrated, floating vessel 102 is depicted as an offshore, semi-submersible oil and gas drilling platform, but could alternatively comprise any other type of floating vessel such as, but not limited to, a drill ship, a pipe-laying ship, a tension-leg platforms (TLPs), a "spar" platform, a production platform, a floating production, storage, and offloading (FPSO) vessel, and/or the like. Additionally, the methods and systems described below may also be utilized on land-based drilling operations. A subsea conduit or riser 108 extends from a deck 110 of floating vessel 102 to a wellhead installation 112 that may comprise one or more blowout preventers 114. A person skilled in the art recognizes that a floating vessel 102 may be connected to multiple wellhead installations 112 where the multiple wellhead installations 112 may be located at varying distances from the floating vessel 102 through riser 108. In examples, riser 108 may also be referred to as a flexible riser, flowline, umbilical, and/or the like. Floating vessel 102 has a hoisting apparatus 116 and a derrick 118 for raising and lowering tubular lengths of drill pipe, such as a tubular 120. In examples, tubular 120 may be a drill string, casing, production pipe, and/or the like.

A wellbore 122 extends through the various earth strata toward the subterranean hydrocarbon bearing formation 104 and tubular 120 may be extended within wellbore 122. Even though FIG. 1 depicts a vertical wellbore 122, it should be understood by those skilled in the art that the methods and systems described are equally well suited for use in horizontal or deviated wellbores. During drilling operations, the distal end of tubular 120, for example a drill sting, may comprise a bottom hole assembly (BHA) that comprises a drill bit and a downhole drilling motor, also referred to as a positive displacement motor ("PDM") or "mud motor." During production operations, tubular 120 may comprise a DAS system 150. DAS system 150 may be inclusive of an interrogator 124, umbilical line 126, and fiber optic cable 128.

Figure 3A:
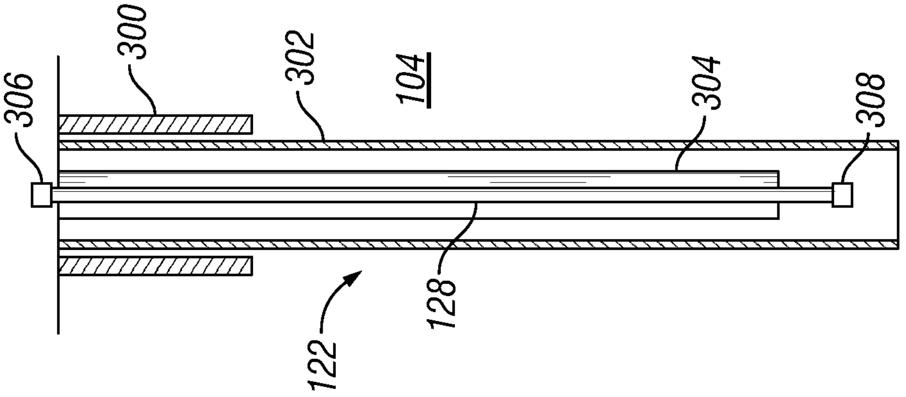
FIGS. 3A-3D illustrates examples of a downhole fiber deployed in a wellbore.

Fiber optic cable 128 may be permanently deployed in a wellbore via single- or dual-trip completion strings, behind casing, on tubing, or in pumped down installations. In examples, fiber optic cable 128 may be temporarily deployed via coiled tubing, wireline, slickline, or disposable cables. FIGS. 3A-3D illustrate different types of deployment of fiber optic cable 128 in wellbore 122 (e.g., referring to FIG. 1). As illustrated in FIG. 3A, wellbore 122 deployed in formation 104 may comprise surface casing 300 in which production casing 302 may be deployed. Additionally, production tubing 304 may be deployed within production casing 302. In this example, fiber optic cable 128 may be temporarily deployed in a wireline system in which a bottom hole gauge 308 is connected to the distal end of fiber optic cable 128. Further illustrated, fiber optic cable 128 may be coupled to a fiber connection 306. Without limitation, fiber connection 306 may attach fiber optic cable 128 to umbilical line 126 (e.g., referring to FIG. 1). Fiber connection 306 may operate with an optical feedthrough system (itself comprising a series of wet- and dry-mate optical connectors) in the wellhead that optically couples fiber optic cable 128 from the tubing hanger to umbilical line 126 on the wellhead instrument panel. Umbilical line 126 may comprise of an optical flying lead, optical distribution system(s), umbilical termination unit(s), and transmission fibers encapsulated in flying leads, flow lines, rigid risers, flexible risers, and/or one or more umbilical lines. This may allow for umbilical line 126 to connect and disconnect from fiber optic cable 128 while preserving optical continuity between the umbilical line 126 and the fiber optic cable 128.

Figure 3B:
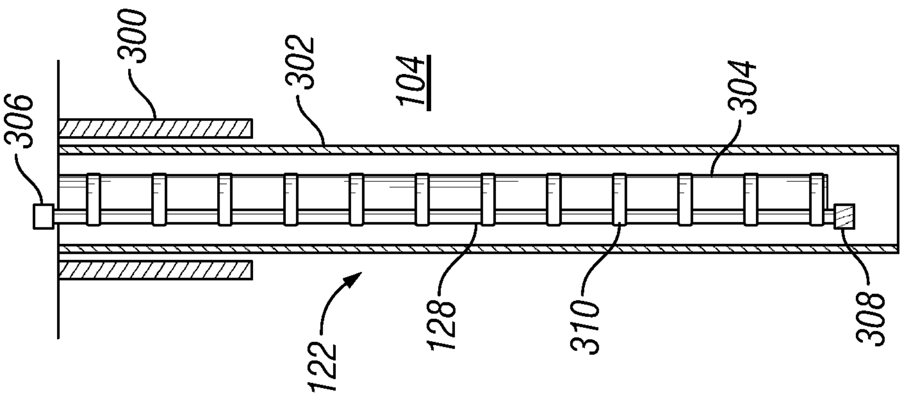

FIG. 3B illustrates a permanent deployment of fiber optic cable 128. As illustrated in wellbore 122 deployed in formation 104 may comprise surface casing 300 in which production casing 302 may be deployed. Additionally, production tubing 304 may be deployed within production casing 302. In examples, fiber optic cable 128 is attached to the outside of production tubing 304 by one or more cross-coupling protectors 310. Without limitation, cross-coupling protectors 310 may be evenly spaced and may be disposed on every other joint of production tubing 304. Further illustrated, fiber optic cable 128 may be coupled to fiber connection 306 at one end and bottom hole gauge 308 at the opposite end.

Figure 3C:
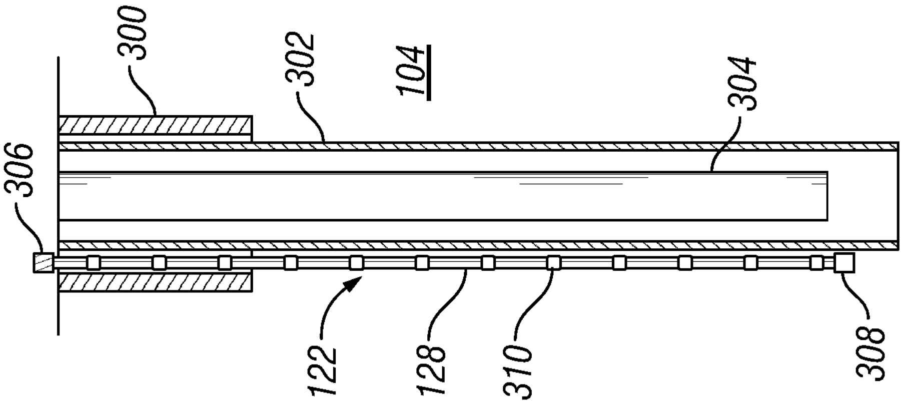

FIG. 3C illustrates a permanent deployment of fiber optic cable 128. As illustrated in wellbore 122 deployed in formation 104 may comprise surface casing 300 in which production casing 302 may be deployed. Additionally, production tubing 304 may be deployed within production casing 302. In examples, fiber optic cable 128 is attached to the outside of production casing 302 by one or more cross-coupling protectors 310. Without limitation, cross-coupling protectors 310 may be evenly spaced and may be disposed on every other joint of production tubing 304. Further illustrated, fiber optic cable 128 may be coupled to fiber connection 306 at one end and bottom hole gauge 308 at the opposite end.

Figure 3D:
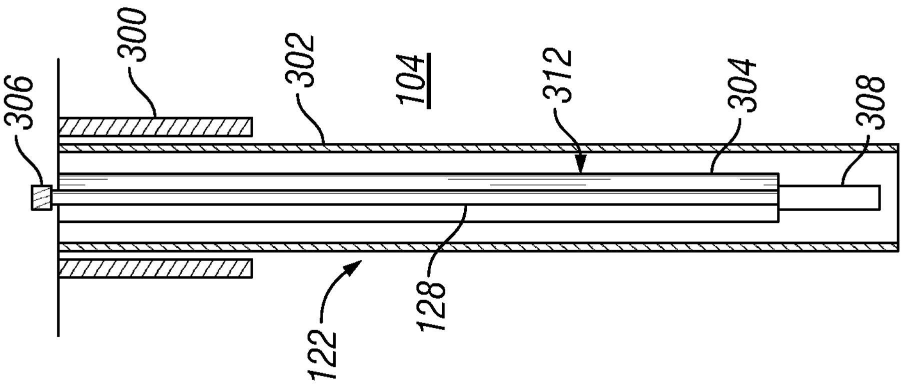

FIG. 3D illustrates a coiled tubing operation in which fiber optic cable 128 may be deployed temporarily. As illustrated in FIG. 3D, wellbore 122 deployed in formation 104 may comprise surface casing 300 in which production casing 302 may be deployed. Additionally, coiled tubing 312 may be deployed within production casing 302. In this example, fiber optic cable 128 may be temporarily deployed in a coiled tubing system in which a bottom hole gauge 308 is connected to the distal end of downhole fiber. Further illustrated, fiber optic cable 128 may be attached to coiled tubing 312, which may move fiber optic cable 128 through production casing 302. Further illustrated, fiber optic cable 128 may be coupled to fiber connection 306 at one end and bottom hole gauge 308 at the opposite end. During operations, fiber optic cable 128 may be used to take measurements within wellbore 122, which may be transmitted to the surface and/or interrogator 124 (e.g., referring to FIG. 1) in the DAS system.

Additionally, within DAS system 150, interrogator 124 may be connected to an information handling system 130 through connection 132, which may be wired and/or wireless. It should be noted that both information handling system 130 and interrogator 124 are disposed on floating vessel 102. Both systems and methods of the present disclosure may be implemented, at least in part, with information handling system 130. Information handling system 130 may comprise any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 130 may be a processing unit 134, a network storage device, or any other suitable device and may vary in size, shape, performance, functionality, and price. Information handling system 130 may comprise random access memory (RAM), one or more processing resources such as a central processing unit (CPU) or hardware or software control logic, ROM, and/or other types of nonvolatile memory. Additional components of the information handling system 130 may comprise one or more disk drives, one or more network ports for communication with external devices as well as an input device 136 (e.g., keyboard, mouse, etc.) and video display 138. Information handling system 130 may also comprise one or more buses operable to transmit communications between the various hardware components.

Alternatively, systems and methods of the present disclosure may be implemented, at least in part, with non-transitory computer-readable media 140. Non-transitory computer-readable media 140 may comprise any instrumentality or aggregation of instrumentalities that may retain data and/or instructions for a period of time. Non-transitory computer-readable media 140 may comprise, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Production operations and sensing operations in a subsea environment present optical challenges for DAS system 150. For example, pulse repetition rate that may be used in DAS system 150 is inversely proportional to fiber length. Additionally, the signal strength decays with distance due to attenuation so the signal strength is approximately inversely proportional with distance. Moreover, the maximum light pulse power that can be launched into the sensing fiber prior to the occurrence of optical nonlinearities such as modulation instability is inversely proportional to the total fiber length, meaning that less light pulse power can be injected in sensing fibers with longer lengths.

Therefore, the quality of the overall signal is poorer with a longer fiber than a shorter fiber. This may impact any operation that may utilize DAS system 150 since the distal end of the fiber contains the interval of interest (i.e., the reservoir) in which fiber optic cable 128 may be deployed. The interval of interest may comprise wellbore 122 and formation 104. For pulsed DAS systems 150 such as the one exemplified in FIG. 1, an additional challenge is the drop in signal-to-noise ratio (SNR) associated with the decrease in the number of light pulses that may be launched into the fiber per second (pulse rate) when interrogating fibers with overall lengths exceeding 10 km. As such, utilizing DAS system 150 in a subsea environment may have to increase the returned signal strength with given pulse power, increase the maximum pulse power that may be used for given fiber optic cable length, maintain the pulse power as high as possible as it propagates down the fiber optic cable length, and increase the number of light pulses that may be launched into the fiber optic cable per second. It is only possible to increase these parameters up to the limit of physics, which limits system performance in various applications.

As illustrated in FIGS. 3A-3D, fiber optic sensing is used for various sensing applications in the oil & gas industry. Fiber optic cable 128, illustrated in FIGS. 3A-3D, may comprise any number of sensors that may be point sensors either at the surface and/or down-hole. Single point or multi-point pressure/temperature sensors may be used in reservoir monitoring applications, where the pressure sensors may be capable of collecting data at rates up to 2,000 Hz or even higher.

In examples, fiber optic cables 128 may house one or several optical fibers and the optical fibers may be single mode fibers, multi-mode fibers or a combination of single mode and multi-mode optical fibers. One or more of the optical fibers deployed in the sensing region of interest may be an optically enhanced fiber with increased Rayleigh backscattering characteristics when compared to normal single mode optical fibers. The increased Rayleigh backscattering characteristics may be due to perturbations of the refractive index in the optical fiber. The fiber optic sensing systems connected to the optical fibers may comprise Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber/cable, or single point sensing systems where the sensors are located at the end of the cable.

During operations, fiber optic sensing systems may operate using various sensing principles like Rayleigh scattering, Brillouin scattering, Raman scattering, and/or the like. Raman scattering may comprise, but is not limited to, amplitude-based sensing systems like DTS systems. Phase sensing-based systems like DAS systems 150 (e.g., referring to FIG. 1) may operate with interferometric sensing using homodyne or heterodyne techniques where the system may sense phase or intensity changes due to constructive or destructive interference. Strain sensing systems like DSS may use dynamic strain measurements based on interferometric sensors or static strain sensing measurements using Brillouin scattering. Quasi-distributed sensors may be based on Fiber Bragg Gratings (FBGs) where a wavelength shift is detected or multiple FBGs are used to form Fabry-Perot type interferometric sensors for phase or intensity based sensing, or single point fiber optic sensors based on Fabry-Perot or FBG or intensity-based sensors.

True Distributed Fiber Optic Sensing (DFOS) systems may operate based on Optical Time Domain Reflectometry (OTDR) principles or Optical Frequency Domain Reflectometry (OFDR). OTDR based systems may be pulsed where one or more optical pulses may be transmitted down an optical fiber and backscattered light (Rayleigh, Brillouin, Raman etc.) is measured and processed. Time of flight for the optical pulse(s) indicate where along the optical fiber the measurement is done. OFDR based systems operate in continuous wave (CW) mode where a tunable laser is swept across a wavelength range, and the back scattered light is collected and processed.

Fiber optic cables 128 may further comprise various hybrid approached where single point or quasi-distributed or distributed fiber optic sensors are mixed with electrical sensors. Therefore, fiber optic cable 128 may then comprise optical fiber and electrical conductors. Electrical sensors may be pressure sensors based on quarts type sensors or strain gauge-based sensors or other commonly used sensing technologies. Pressure sensors, optical or electrical, may be housed in dedicated gauge mandrels or attached outside the casing in various configurations for down-hole deployment or deployed conventionally at the surface well head or flow lines.

Temperature measurements from a DTS system may be used to determine locations for water injection applications where fluid inflow in the treatment well as the fluids from the surface are likely to be cooler than formation temperatures. During operations, a DTS warm-back analysis may be utilized to determine fluid volume placement, this is often done for water injection wells and the same technique may be used for fracturing fluid placement. Temperature measurements in observation wells may be used to determine fluid communication between the treatment well and observation well, or to determine formation fluid movement.

DAS data may be used to determine fluid allocation in real-time as acoustic noise is generated when fluid flows through the casing and in through perforations into the formation. Phase and intensity based interferometric sensing systems may be sensitive to temperature and mechanical as well as acoustically induced vibrations. DAS data may be converted from time series data to frequency domain data using Fast Fourier Transforms (FFT) and other transforms like wavelet transforms may also be used to generate different representations of the data. Various frequency ranges may be used for different purposes. In examples, low frequency signal changes may be attributed to formation strain changes or temperature changes due to fluid movement and other frequency ranges may be indicative if fluid or gas movement. Various filtering techniques and models may be applied to generate indicators of events than may be of interest. Indicators may comprise formation movement due to growing natural fractures, formation stress changes during the fracturing operations and this effect may also be called stress shadowing. During operations, fluid seepage may be sensed by fiber optic cables during a fracturing operation as formation movement may force fluid into and observation well. This may comprise, but is not limited to, fluid flow from fractures, and/or fluid and proppant flow from frac hits. Each indicator may have a characteristic signature in terms of frequency content and/or amplitude and/or time dependent behavior, and these indicators may be. These indicators may also be present at other data types and not limited to DAS data. Fiber optic cables used with DAS systems may comprise enhanced back scatter optical fibers where the Rayleigh backscatter may be increased by 10× or more with associated increase in Optical Signal to Noise Ratio (OSNR).

DAS systems 150 (e.g., referring to FIG. 1) may also be used to detect various seismic events where stress fields and/or growing fracture networks generate micro seismic events or where perforation charge events may be used to determine travel time between horizontal wells and this information may be used from stage to stage to determine changes in travel time as the formation is fractured and filled with fluid and proppant. DAS systems 150 may also be used with surface seismic sources to generate Vertical Seismic Profiles (VSPs) before, during and after a fracturing job to determine the effectiveness of the fracturing job as well as determine production effectiveness. VSPs and reflection seismic surveys may be used over the life of a well and/or reservoir to track production related depletion and/or track water, gas, polymer flood fronts, and/or the like.

DSS data may be generated using various approaches and static strain data may be used to determine absolute strain changes over time. Static strain data is often measured using Brillouin based systems or quasi-distributed strain data from FBG based system. Static strain may also be used to determine propped fracture volume by looking at deviations in strain data from a measured strain baseline before fracturing a stage. It may also be possible to determine formation properties like permeability, poroelastic responses and leak off rates based on the change of strain vs time and the rate at which the strain changes over time. Dynamic strain data may be used in real-time to detect fracture growth through an appropriate inversion model, and appropriate actions like dynamic changes to fluid flow rates in the treatment well, addition of diverters or chemicals into the fracturing fluid or changes to proppant concentrations or types may then be used to mitigate detrimental effects.

Fiber Bragg Grating based systems may also be used for a number of different measurements. FBG's are partial reflectors that may be used as temperature and strain sensors or may be used to make various interferometric sensors with very high sensitivity. FBG's may be used to make point sensors or quasi-distributed sensors where these FBG based sensors may be used independently or with other types of fiber optic-based sensors. FBG's may manufactured into an optical fiber at a specific wavelength, and other system like DAS, DSS or DTS systems may operate at different wavelengths in the same fiber and measure different parameters simultaneously as the FBG based systems using Wavelength Division Multiplexing (WDM) and/or Time Division Multiplexing (TDM).

The sensors may be placed in either the treatment well or monitoring well(s) to measure well communication. The treatment well pressure, rate, proppant concentration, diverters, fluids and chemicals may be altered to change the hydraulic fracturing treatment. These changes (i.e., stress fields change) may impact the formation responses in several different ways and this may generate micro seismic effects that may be measured with DAS systems and/or single point seismic sensors like geophones. These sensors may allow for measuring fracture growth rates as they change and this may generate changes in measured micro seismic events and event distributions over time, or changes in measured strain using the low frequency portion or the DAS signal or Brillouin based sensing systems. Pressure changes due to poroelastic effects may be measured in the monitoring well and pressure data may be measured in the treatment well and correlated to formation responses. Thus, various changes in treatment rates and pressure may generate events that may be correlated to fracture growth rates.

Several measurements may be combined to determine adjacent well communication, and this information may be used to change the hydraulic fracturing treatment schedule to generate desired outcomes. Multiple wells in a field and/or reservoir may be instrumented with optical fibers for monitoring subsurface reservoirs from cradle to grave. Subsurface applications may comprise hydrocarbon extraction, geothermal energy production and/or fluid injection like water or CO2 in CCUS application.

Figure 2:
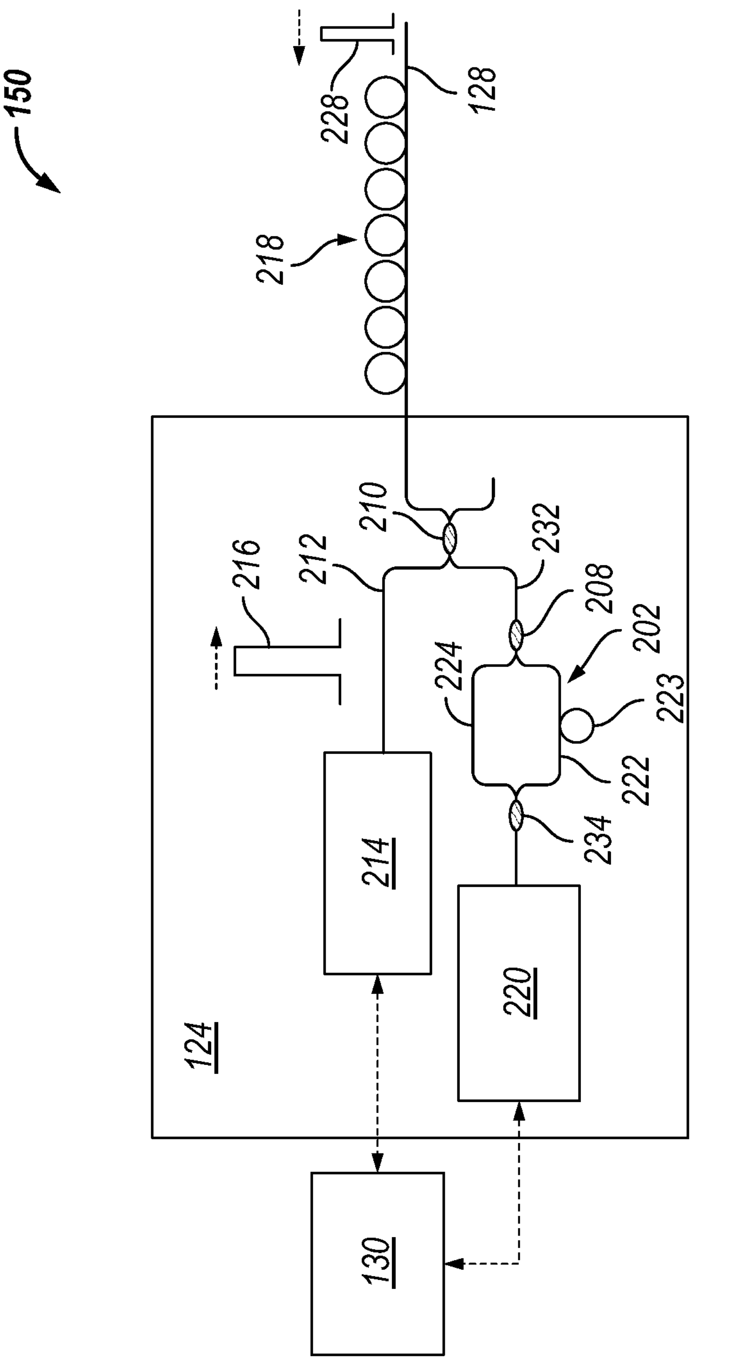
FIG. 2 illustrates an example of a DAS system.

FIG. 2 illustrates an example of DAS system 150. DAS system 150 may comprise information handling system 130 that is communicatively coupled to interrogator 124. Without limitation, DAS system 150 may comprise a single-pulse coherent Rayleigh scattering system with a compensating interferometer. In examples, DAS system 150 may be used for phase-based sensing of events in a wellbore using measurements of coherent Rayleigh backscatter or may interrogate a fiber optic line containing an array of partial or distributed reflectors or fiber core perturbations, for example, fiber Bragg gratings, which provide backscatter cross-sections exceeding the background Rayleigh backscatter limits.

As illustrated in FIG. 2, interrogator 124 may comprise a pulse generator 214 coupled to a first coupler 210 using an optical fiber 212. Pulse generator 214 may be a laser, or a laser connected to at least one amplitude modulator, or a laser connected to at least one switching amplifier, i.e., semiconductor optical amplifier (SOA). First coupler 210 may be a traditional fused type fiber optic splitter, a circulator, a Planar Waveguide Circuit (PLC) fiber optic splitter, or any other type of splitter known to those with ordinary skill in the art. Pulse generator 214 may be coupled to optical gain elements (not shown) to amplify pulses generated therefrom. Example optical gain elements comprise, but are not limited to, Erbium Doped Fiber Amplifiers (EDFAs) or Semiconductor Optical Amplifiers (SOAs).

DAS system 150 may comprise an interferometer 202. Without limitations, interferometer 202 may comprise a Mach-Zehnder interferometer. For example, a Michelson interferometer or any other type of interferometer 202 may also be used without departing from the scope of the present disclosure. Interferometer 202 may comprise a top interferometer arm 224, a bottom interferometer arm 222, and a gauge 223 positioned on bottom interferometer arm 222. Interferometer 202 may be coupled to first coupler 210 through a second coupler 208 and an optical fiber 232. Interferometer 202 further may be coupled to a photodetector assembly 220 of DAS system 150 through a third coupler 234 opposite second coupler 208. Second coupler 208 and third coupler 234 may be a traditional fused type fiber optic splitter, a PLC fiber optic splitter, or any other type of optical splitter known to those with ordinary skill in the art. Photodetector assembly 220 may comprise associated optics and signal processing electronics (not shown). Photodetector assembly 220 may be a semiconductor electronic device that uses the photoelectric effect to convert light to electricity. Photodetector assembly 220 may be an avalanche photodiode or a pin photodiode but is not intended to be limited to such.

When operating DAS system 150, pulse generator 214 may generate a first optical pulse 216 which is transmitted through optical fiber 212 to first coupler 210. First coupler 210 may direct first optical pulse 216 through a fiber optic cable 128. It should be noted that fiber optic cable 128 may be comprised in umbilical line 126 and/or fiber optic cable 128 (e.g., FIG. 1). As illustrated, fiber optic cable 128 may be coupled to first coupler 210. As first optical pulse 216 travels through fiber optic cable 128, imperfections in fiber optic cable 128 may cause a portion of the light to be backscattered along fiber optic cable 128 due to Rayleigh scattering. Scattered light according to Rayleigh scattering is returned from every point along fiber optic cable 128 along the length of fiber optic cable 128 and is shown as backscattered light 228 in FIG. 2. This backscatter effect may be referred to as Rayleigh backscatter. Density fluctuations in fiber optic cable 128 may give rise to energy loss due to the scattered light, $\alpha_{scat}$, with the following coefficient:

$$\alpha_{scat} = \frac{8\pi^3}{3\lambda^4} n^8 p^2 k T_f \beta \tag{1}$$

where n is the refractive index, p is the photoelastic coefficient of fiber optic cable 128, k is the Boltzmann constant, and β is the isothermal compressibility. $T_f$ is a fictive temperature, representing the temperature at which the density fluctuations are "frozen" in the material. Fiber optic cable 128 may be terminated with a low reflection device (not shown). In examples, the low reflection device (not shown) may be a fiber coiled and tightly bent to violate Snell's law of total internal reflection such that all the remaining energy is sent out of fiber optic cable 128, via macrobending.

Backscattered light 228 may travel back through fiber optic cable 128, until it reaches second coupler 208. First coupler 210 may be coupled to second coupler 208 on one side by optical fiber 232 such that backscattered light 228 may pass from first coupler 210 to second coupler 208 through optical fiber 232. Second coupler 208 may split backscattered light 228 based on the number of interferometer arms so that one portion of any backscattered light 228 passing through interferometer 202 travels through top interferometer arm 224 and another portion travels through bottom interferometer arm 222. Therefore, second coupler 208 may split the backscattered light from optical fiber 232 into a first backscattered pulse and a second backscattered pulse. The first backscattered pulse may be sent into top interferometer arm 224. The second backscattered pulse may be sent into bottom interferometer arm 222. These two portions may be re-combined at third coupler 234, after they have exited interferometer 202, to form an interferometric signal.

Interferometer 202 may facilitate the generation of the interferometric signal through the relative phase shift variations between the light pulses in top interferometer arm 224 and bottom interferometer arm 222. Specifically, gauge 223 may cause the length of bottom interferometer arm 222 to be longer than the length of top interferometer arm 224. With different lengths between the two arms of interferometer 202, the interferometric signal may comprise backscattered light from two positions along fiber optic cable 128 such that a phase shift of backscattered light between the two different points along fiber optic cable 128 may be identified in the interferometric signal. The distance between those points L may be half the length of the gauge 223 in the case of a Mach-Zehnder configuration, or equal to the gauge length in a Michelson interferometer configuration.

While DAS system 150 is running, the interferometric signal will typically vary over time. The variations in the interferometric signal may identify strains in fiber optic cable 128 that may be caused, for example, by seismic energy. By using the time of flight for first optical pulse 216, the location of the strain along fiber optic cable 128 and the time at which it occurred may be determined. If fiber optic cable 128 is positioned within a wellbore, the locations of the strains in fiber optic cable 128 may be correlated with depths in the formation in order to associate the seismic energy with locations in the formation and wellbore.

To facilitate the identification of strains in fiber optic cable 128, the interferometric signal may reach photodetector assembly 220, where it may be converted to an electrical signal. The photodetector assembly may provide an electric signal proportional to the square of the sum of the two electric fields from the two arms of the interferometer. This signal is proportional to:

$$P(t) = P_1 + P_2 + 2^* Sqrt(P_1 P_2)\cos(\phi_1 - \phi_2) \tag{2}$$

where $P_n$ is the power incident to the photodetector from a particular arm (1 or 2) and $\phi_n$ is the phase of the light from the particular arm of the interferometer. Photodetector assembly 220 may transmit the electrical signal to information handling system 130, which may process the electrical signal to identify strains within fiber optic cable 128 and/or convey the data to a display and/or store it in computer-readable media. Photodetector assembly 220 and information handling system 130 may be communicatively and/or mechanically coupled. Information handling system 130 may also be communicatively or mechanically coupled to pulse generator 214.

Modifications, additions, or omissions may be made to FIG. 2 without departing from the scope of the present disclosure. For example, FIG. 2 shows a particular configuration of components of DAS system 150. However, any suitable configurations of components may be used. For example, pulse generator 214 may generate a multitude of coherent light pulses, optical pulse 216, operating at distinct frequencies that are launched into the sensing fiber either simultaneously or in a staggered fashion. For example, the photo detector assembly is expanded to feature a dedicated photodetector assembly for each light pulse frequency. In examples, a compensating interferometer may be placed in the launch path (i.e., prior to traveling down fiber optic cable 128) of the interrogating pulse to generate a pair of pulses that travel down fiber optic cable 128. In examples, interferometer 202 may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 223 of FIG. 1) may be used to delay one of the pulses. To accommodate phase detection of backscattered light using DAS system 150, one of the two branches may comprise an optical frequency shifter (for example, an acousto-optic modulator) to shift the optical frequency of one of the pulses, while the other may comprise a gauge length. This may allow using a single photodetector receiving the backscatter light to determine the relative phase of the backscatter light between two locations by examining the heterodyne beat signal received from the mixing of the light from different optical frequencies of the two interrogation pulses. In another embodiment of DAS system 150, pulse generator 214 may be configured to output a frequency modulated light pulse that has been chirped over several GHz e.g., in a linear fashion. This allows for longer optical light pulses (more light energy) being launched into the sensing fiber when compared to DAS systems 150 that output monochromatic light pulses. Chirp compression techniques as typically used in radar applications can then be applied to the detected back-reflected signal to compress the chirped signal back into a short pulse to improve spatial resolution.

In examples, DAS system 150 may generate interferometric signals for analysis by the information handling system 130 without the use of a physical interferometer. For instance, DAS system 150 may direct backscattered light to photodetector assembly 220 without first passing it through any interferometer, such as interferometer 202 of FIG. 2. Alternatively, the backscattered light from the interrogation pulse may be mixed with the light from the laser originally providing the interrogation pulse. Thus, the light from the laser, the interrogation pulse, and the backscattered signal may all be collected by photodetector 220 and then analyzed by information handling system 130. The light from each of these sources may be at the same optical frequency in a homodyne phase demodulation system or may be different optical frequencies in a heterodyne phase demodulator. This method of mixing the backscattered light with a local oscillator allows measuring the phase of the backscattered light along the fiber relative to a reference light source.

Fiber optic cables 128 (e.g., referring to FIG. 1), connectors and signal routing components all have optical attenuation. Fiber optic interrogators used for fiber optic sensing and reservoir monitoring have an optical dynamic range, or Optical Signal to Noise Ratio (OSNR), defined by the maximum signal power that may be launched into a sensing system (transmission fiber, sensing fiber, sensors) and the noise floor of the sensing system.

The maximum signal power that may be launched into an optical fiber may be limited by the optical source, and this may sometimes be overcome by using optical amplifiers like Erbium Doped Fiber Amplifiers (EDFAs), where the signal amplitude is increased. EDFAs are opto-electric devices with power supplies, electronics and specialty optics packaged into bench-top enclosures, or rack mount enclosures or miniaturized so that they may be comprised in as sub-components of other electrical systems.

Other limitations of the maximum signal power may comprise thermal damage to connectors or other optical components commonly used in routing optical signals. Free-space optics and lenses are used to build micro-optic components like optical isolators, Wavelength Division Multiplexers (WDMs), filters, circulators, and/or the like, which may be used to route signals in a directional fashion. Any point in the system where the optical signal exits/enters the optical fiber may be a point of concern where thermal damage due to high optical power levels may occur.

Yet other limitations comprise non-linear fiber transmission penalties like Stimulated Brillouin Scattering (SBS), Stimulated Raman Scattering (SRS), Kerr-effect related phenomena like Self-Phase Modulation (SPM), Cross-Phase Modulation (XPM), modulation instability, soliton formation or Four Wave Mixing (FWM). The non-linear effects may be influenced by a number of parameters such as fiber dispersion, fiber effective area, channel spacing in WDM systems, signal intensity and source line width.

The noise floor and system SNR may in many instances be limited by interrogator system design, photo detector noise, optical component losses, and/or the like. The use of EDFAs must also be considered and optimized as both signal and noise are amplified, and small signal gain is typically higher than large signal gain. Optical component losses prior to the gain element in the EDFA may also decrease the signal to noise. As a device, EDFA's are characterized by Noise Figure (NF) which is a measure of the degradation of the SNR. For example, if the signal is amplified the noise may be amplified even more and the losses prior to the gain element may reduce the signal amplitude so the actual SNR may be reduced.

Another challenge with pulsed sensing systems like Distributed Temperature Sensing (DTS), Distributed Acoustic Sensing (DAS) and Distributed Strain Sensing (DSS) systems is that only one signal at a given wavelength may propagate through the sensing section of the optical fiber at any given time in order to prevent back-scattered light from multiple locations along the sensing fiber from returning to the respective distributed sensing systems at the same time. This limits the pulse repetition rate in optical systems, which in turn limits the frequency content of signals as well as the amount of averaging of signals that may be done for any given time period.

Figure 4:
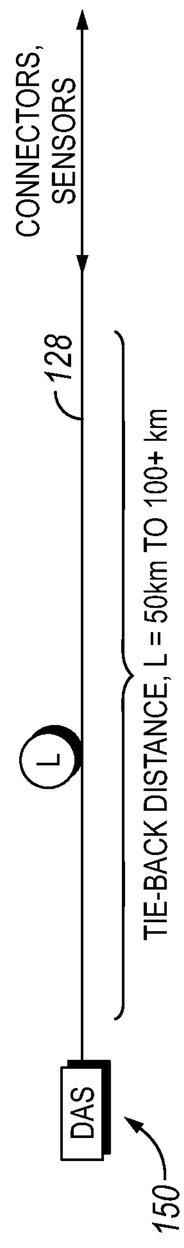
FIG. 4 illustrates an example of a DAS system with an extended length of fiber optic cable.

FIG. 4 illustrates an example of a DAS system 150 with an extended length of fiber optic cable 128. Assuming a refractive index of 1.5 of fiber optic cable 128, the two-way travel time of light in a fiber is about 10 ns/m. Thus, for the reasons outlined above, for a 5 km long fiber optic cable 128, it is necessary to wait at least 50 μs before the next light pulse may be launched into fiber optic cable 128, which may be operating as a sensing fiber. This is equivalent to a maximum sampling rate of the fiber optic sensing system of 20 kHz or a bandwidth of 10 kHz. If the length of fiber optic cable 128 were to increase to 25 km, the maximum attainable sampling rate (interval) drops to 5 kHz (250 μs) or 2.5 kHz bandwidth. This dependency of length of fiber optic cable 128 and pulse repetition rate is illustrated in FIGS. 5A and 5B.

Figure 5A:
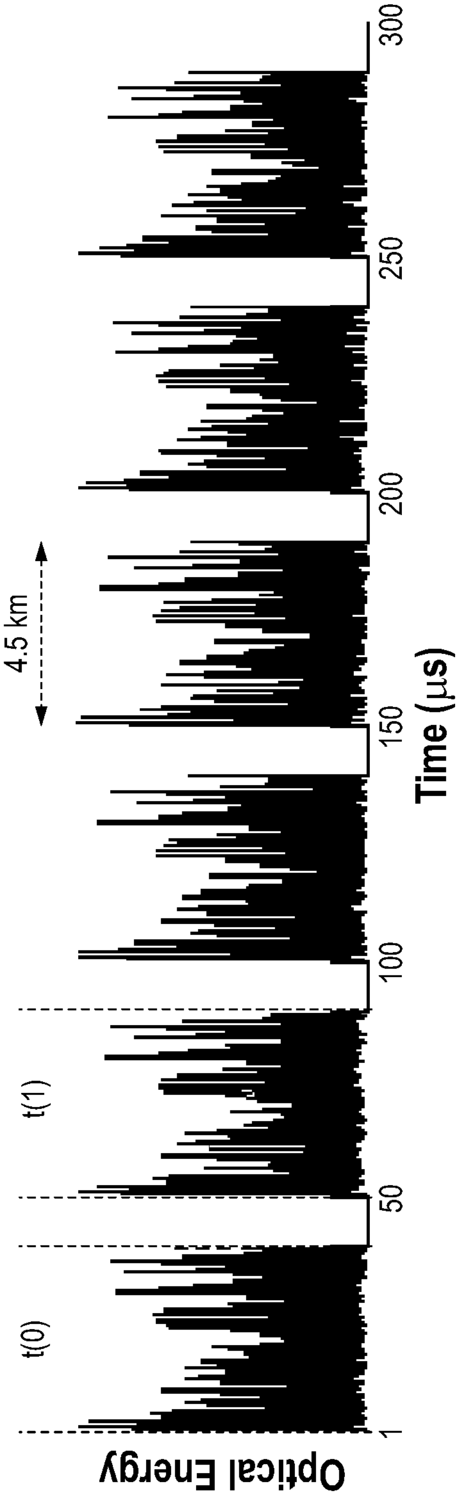
FIGS. 5A and 5B are two graphs which are compared to show optical backscattered energy as a function of time.
Figure 5B:
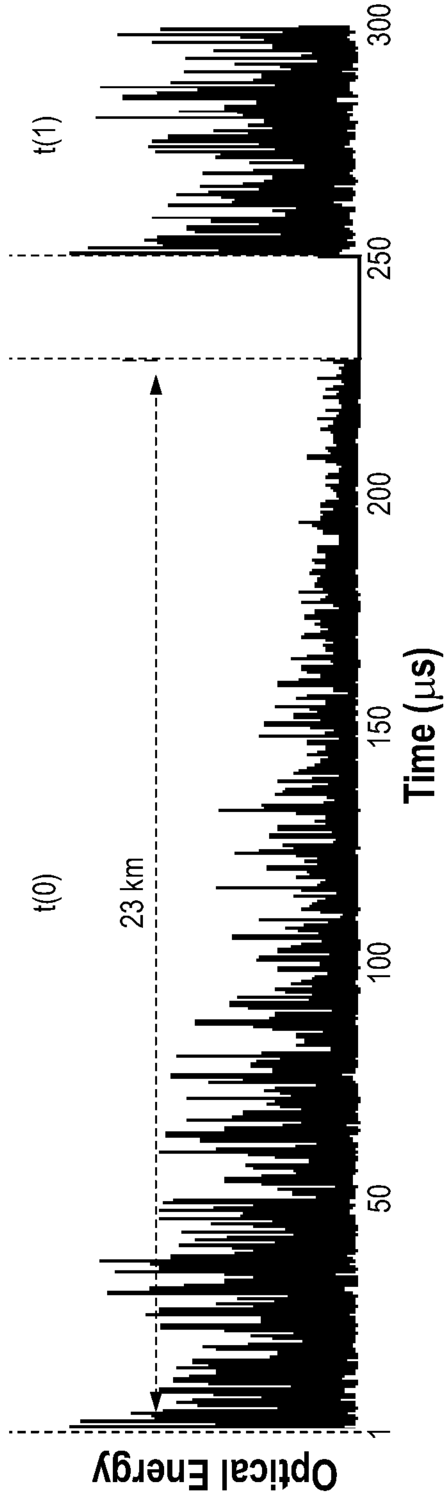
Figure 6:
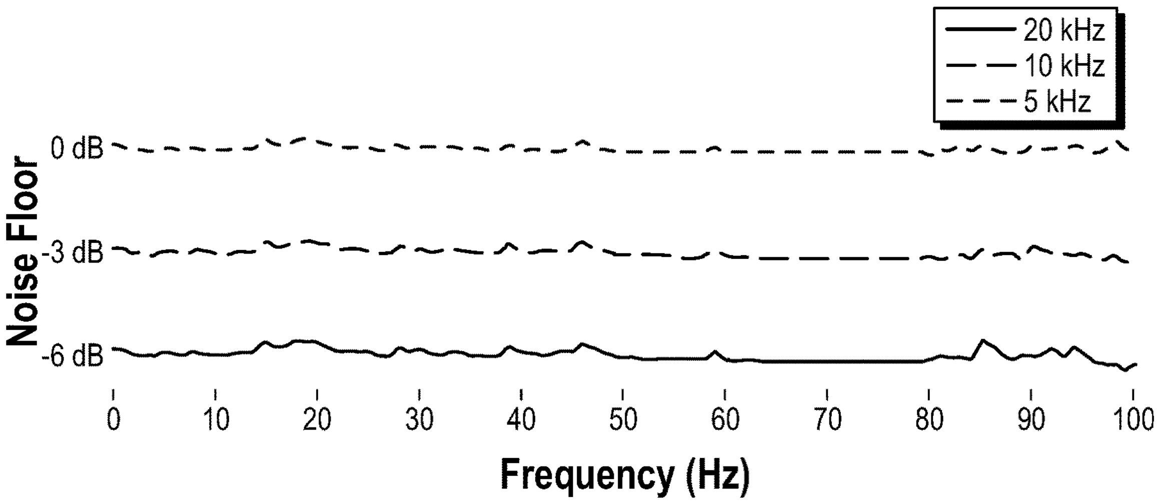
FIG. 6 is a graph that shows the DAS noise floor for frequencies between 0 and 100 Hz.

FIGS. 5A and 5B are two graphs which are compared to show optical backscattered energy as a function of time for a 4.5 km sensing fiber (top) and a 23 km long fiber optic cable 128 (e.g., referring to FIG. 4). Light pulses are launched into the 4.5 km and 23 km sensing fiber every 50 μs and 250 μs, respectively, ensuring that at any time only one light pulse is contained within fiber optic cable 128. During measurement operations, a sampling rates of less than 5 kHz may not be sufficient for DAS applications that rely on broadband acoustic responses, such as discriminating between different flow regimes and/or detecting sand ingress. Moreover, this sampling rate limitation also affects the data quality of other, low(er) bandwidth DAS applications such as Vertical Seismic Profiling (VSP) where the highest frequency of interest typically does not exceed 100 Hz. This is because the intricate sampling scheme of DAS systems 150 (e.g., referring to FIG. 1) blends spatial and temporal samples into a single 1D data stream preventing the meaningful use of antialiasing filters prior to analog-to-digital conversion. This in turn causes noise that occurs at frequencies above the Nyquist frequency to be folded back into the sub-Nyquist frequency band. This effect is further illustrated in FIG. 6. FIG. 6 is a graph that shows the DAS noise floor for frequencies between 0 and 100 Hz when using different DAS pulse repetition rates. FIG. 6 illustrates a noise floor for a DAS system between 0 and 100 Hz for three different DAS sampling frequencies. The graph illustrates that OSNR is improved by 3 dB for every doubling in pulse repetition rate.

Methods and system discussed below overcome and actively mitigate issues faced over longer fiber optic cables 128 (e.g., referring to FIG. 4). As discussed below, this is achieved by creating a largely loss-less transmission span using a combination of distributed and point gain elements strategically placed in the overall system architecture. This turns long transmission fiber lengths virtually invisible from a sensing system perspective while maintaining a high Optical Signal to Noise Ratio (OSNR)

To overcome issues faced by longer fiber optic cables 128 (e.g., referring to FIG. 4), a DAS system 150 may utilize remotely supported/remote pumped optical gain elements in existing fiber optic cables 128 located in umbilical lines, flow lines, communication cables to overcome distributed fiber losses and point losses due to connectors, splices, and/or the like. This should negate inherent system losses that may limit the ability to extend the reach of applications both onshore and offshore. DAS system 150 may comprise system gain monitoring capabilities where signals may be measured at transmission and receiving points as well as injected at dedicated points on demand to measure backscattered Rayleigh components over distance thus enabling distributed gain monitoring, control, and automation.

Figure 7:
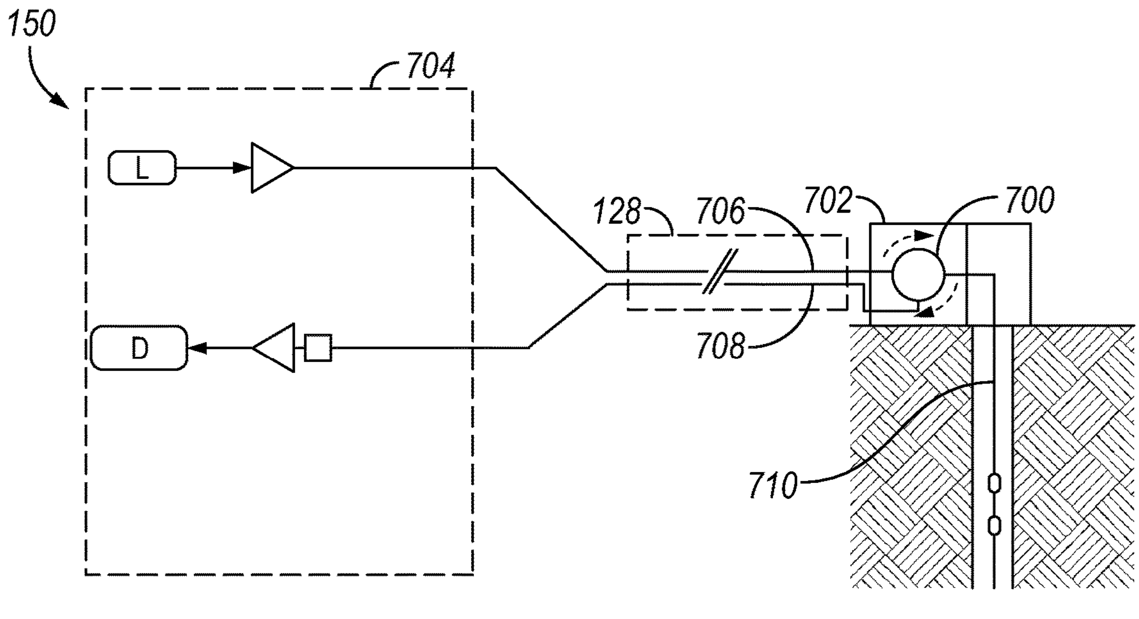
FIG. 7 illustrates one example in which DAS system may prevent optical noise events caused by strong reflections.

FIG. 7 illustrates one example in which DAS system 150 may prevent optical noise events caused by strong reflections (e.g., poorly mated connectors) occurring within fiber optic cable 128 between surface processing equipment and wellhead to reach noise-sensitive optical components within the surface processing equipment 704. As illustrated, fiber optic cable may comprise a transmission fiber 706 and a return fiber 708. Preventing optical noise may be achieved by placing a circulator 700 in close proximity of wellhead 702. Circulators are free-space optical components with a certain amount of optical attenuation. Circulators are passive optical devices. Passive optical devices are devices that are optically connected to a fiber optic cable to receive and direct light (e.g., light pulses) along the fiber optic cable to at least another fiber optic cable connected to the passive optical device. Although circulators are described herein for this disclosure, any suitable passive optical device may be utilized in place of the circulator. Examples of suitable passive optical devices include a fused type fiber optic splitter, a Planar Waveguide Circuit (PLC) fiber optic splitter, or any other type of optical splitter. Additionally, DAS system 150 may overcome the sampling rate limitation of traditional pulsed fiber-optic sensing systems in extended reach scenarios, which may be performed by placing a downhole sensing fiber 710 after circulator 700 which in turn enables similar pulse repetition rates than in scenarios where the surface processing equipment is placed in immediate proximity of wellhead 702.

Figure 8:
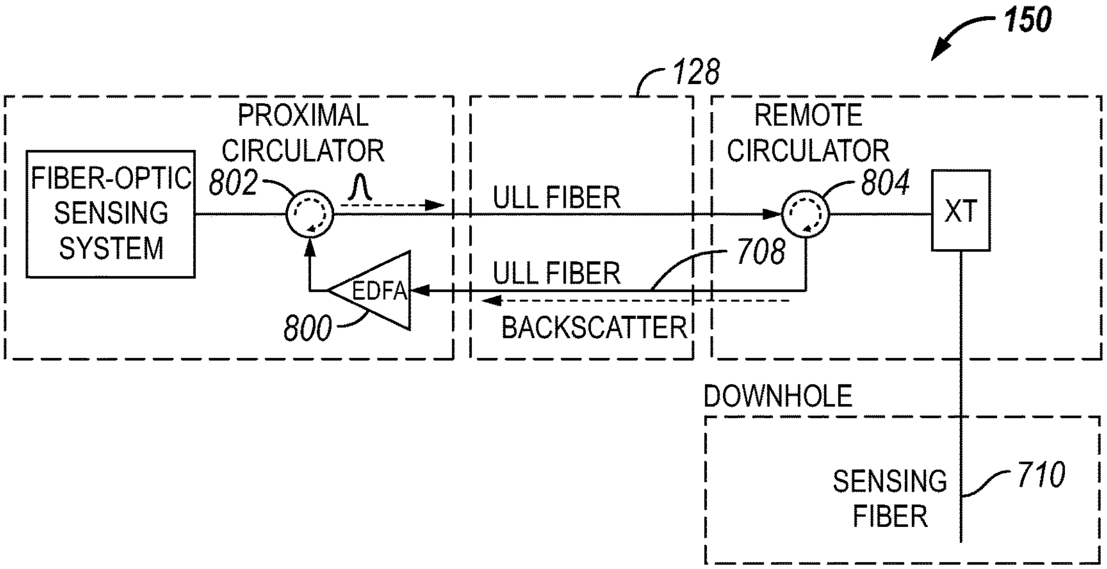
FIG. 8 illustrates an example that utilizes an optical amplifier placed in the upgoing fiber optic cable just prior to proximal circulator.

FIG. 8 illustrates DAS system 150 that overcomes sampling rate limitations of traditional pulsed fiber-optic sensing systems. As illustrated, an optical amplifier 800 is placed in return fiber 708 of fiber optic cable 128 just prior to a proximal circulator 802 to selectively amplify the backscattered light originating from downhole sensing fiber 710, and from distal circulator 804. This example may allow for an increase in sampling rates over traditional pulsed fiber-optic sensing systems.

Figure 9:
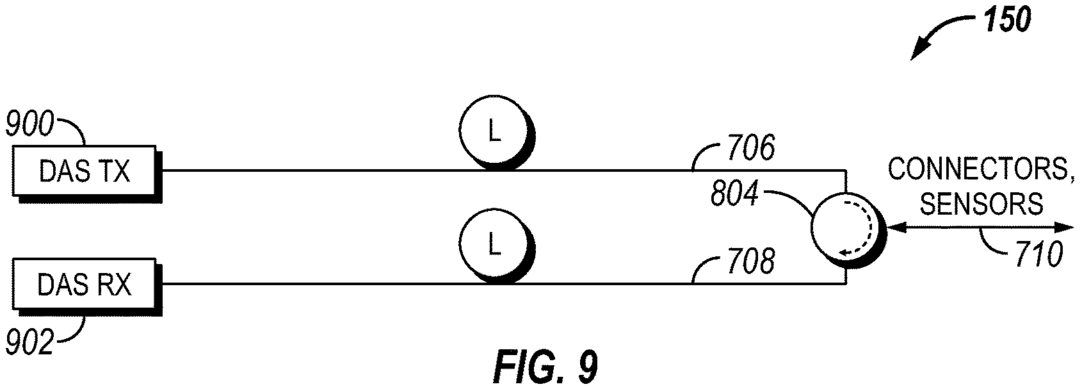
FIG. 9 illustrates an example in which launch arm and receiver arm of DAS system may be de-coupled.

FIG. 9 illustrates an example in which transmission fiber 706 and return fiber 708 of DAS system 150 may be de-coupled. In this example proximal circulator 802 (e.g., referring to FIG. 8) is omitted. Omission of proximal circulator 802 (e.g., referring to FIG. 8) may eliminate the point loss introduced by proximal circulator 802 without limiting or departing from the scope of solutions introduced in this disclosure to overcome the losses accrued in extended reach systems. However, transmission fiber 706 and return fiber 708 are attached to distal circulator 804. Additionally, downhole fiber 710 is attached to distal circulator 804. As illustrated, transmission fiber 706 may be connected to a transmitter 900 and return fiber 708 may be connected to receivers 902. IT should be noted that all transmitters discussed above or below may be any number of sensing systems that work together or individually. Sensing systems may include DAS systems, B-DTS systems, DTS systems, Raman systems, and/or the like. Respectively, the systems may operate utilizing a rayleigh scattering measurement, a brillouin scatter measurement, or a raman scattering measurement. Transmitter 900 may utilize a narrow linewidth continuous wave (CW) laser followed by a gating mechanism, for example, a shutter (switch, Semiconductor Optical Amplifier (SOA) or similar) to create a short pulse. The pulse may be amplified using an EDFA or SOA. Similarly, a pulsed laser may be used and the laser pulse may be amplified using and EDFA or SOA. The transmitter assembly may comprise filters to remove Amplified Spontaneous Emission (ASE) from the gain elements (SOA, EDFA etc.). In a OFDR based systems, a swept wavelength or tunable laser followed by an amplifier (SOA/EDFA) may be utilized.

Additionally, in an OTDR based systems, a pulsed laser sources may be utilized as transmitters (or transmitter assemblies).

Receivers 902 or receiver assemblies may be an opto-electric device that converts photons/optical light into electrons/electric signal with suitable optical and electrical amplification and filtering. Examples of optical to electrical conversion devices comprise various photo diodes, avalanche photodiodes, photo-multiplier tubes/assemblies etc. Optical amplification may comprise of EDFA's and SOA's, optical filtering may comprise of WDM's and ASE filters, electrical amplification would be done using various low noise amplifiers and may include hardwired filtering to eliminate out of band signals, followed by additional signal processing and filtering once in the electrical/digital domain.

Figure 10:
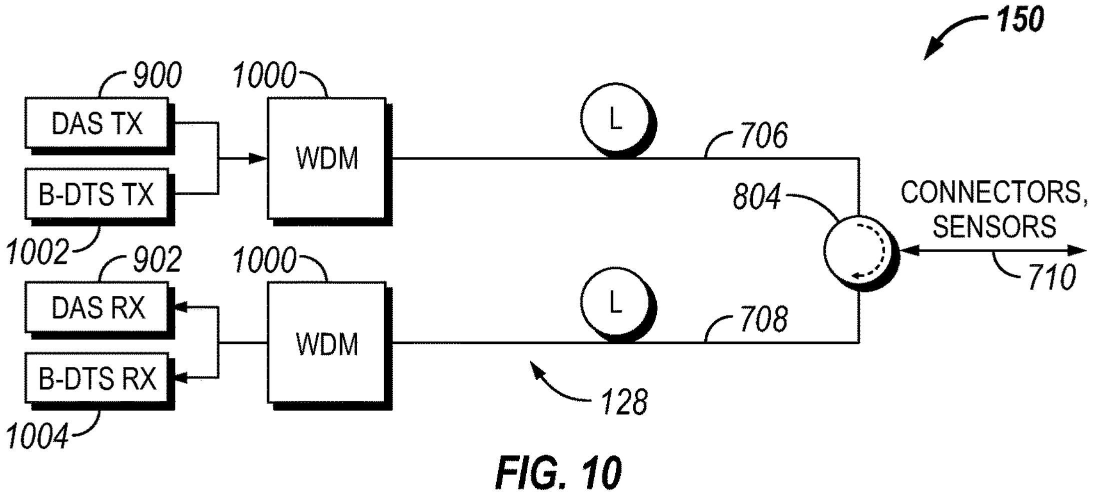
FIG. 10 further illustrates DAS system with Brillouin DTS.

FIG. 10 further illustrates DAS system 150 in which transmission fiber 706 and a return fiber 708 are each connected to a micro-optic wavelength divisional multiplexer (WDM) 1000. Although a micro-optic WDM is illustrate here, any WDM may be utilized, such as a fused fiber WDM, splitter, and/or the like. Micro-optic WDM 1000 comprises of one or more interference optical filters which may accommodate very closely spaced optical channels or wavelengths on the order of 0.4 nm (50 GHz) spacing or better. In examples, micro-optic WDM 1000 may function and operate to guide and direct optical signals, and to filter out of band signals. WDM's may combine and/or split optical signals based on the wavelength of the optical signals. WDM's may provide low loss signal paths for select wavelength bands while attenuating other wavelength bands. WDMs may often be the most efficient (low loss, high isolation to undesired signals) way to route and guide signals. Other devices may be utilized to perform similar functions using other components where the optical attenuation may be higher and where the optical attenuation may be overcome by using additional optical amplification. As illustrated, micro-optic WDM 1000 may connect transmission fiber 706 to Brillouin DTS transmitter 1002 and transmitter 900. Additionally, micro-optic WDM 1000 may connect return fiber 708 to Brillouin DTS receiver 1004 and receiver 902. Brillouin DTS transmitter 1002 and Brillouin DTS receiver 1004 may function and operate to form a complete Brillouin interrogator system as the electrical control signals to Brillouin DTS transmitter 1002 may come from an information handling system 130. Additionally, the electrical signals from the Brillouin receiver may be collected by the same computer controlling the Brillouin DTS transmitter 1002. Other computing and control devices may be used in any combination with information handling system 130. It is understood that any transmitter 900 and/or receiver 902 circuit may be connected to an information handling system 130 for command and control as well as data acquisition and processing in order to form a complete system. Other systems and methods may comprise Raman power routing with lower loss through fiber optic cable 128.

Figure 11:
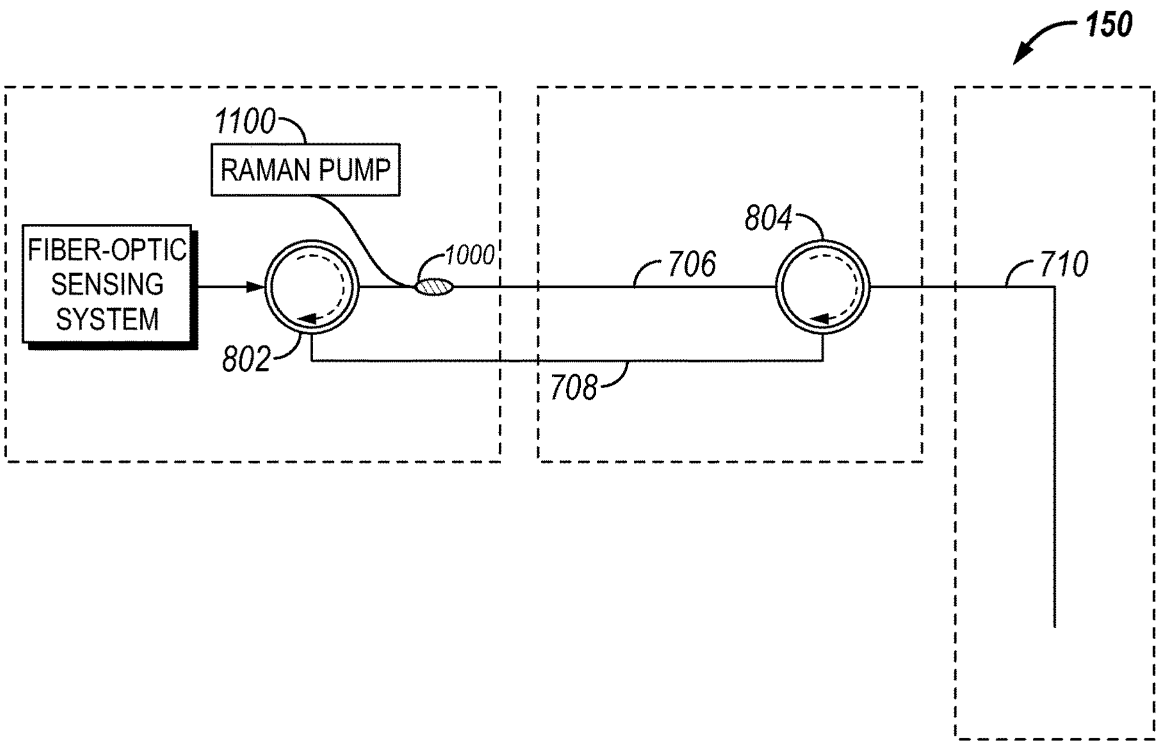
FIG. 11 illustrates an example that uses co-pumped Raman amplification.

FIG. 11 comprises all devices from FIG. 8 and further an example in which as co-pumped Raman amplification is utilized in DAS system 150. In this example, a Raman pump 1100 is used to co-propagate Raman pump light with the downward traveling light signals in transmission fiber 706 in order to mitigate optical attenuation at the light signal wavelengths. In examples, Raman amplification may be used in a counter propagating mode for the signals returning to the surface through return fiber 708 from distal circulator 804. In other examples, methods and systems may re-route Raman pump light in order to use any remnant Raman pump optical power to amplify any signals being routed to the surface.

Figure 12:
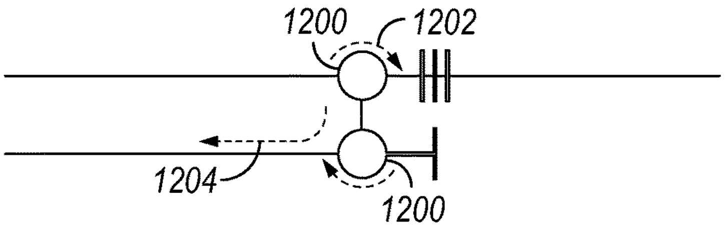
FIG. 12 illustrates the routing the remnant Raman pump power as the light goes through two circulators.

FIG. 12 illustrates an example in which distal circulator 804 (e.g., referring to FIG. 11) is replaced with two circulators. This may allow for routing the remnant Raman pump power as the light goes through two circulators 1200 with a downward pass 1202 and an upward pass 1204 for each circulator 1200 at a loss of 0.8 dB-1 dB each way, a filter and a reflective element resulting in 4-5 dB of optical loss.

Figure 13:
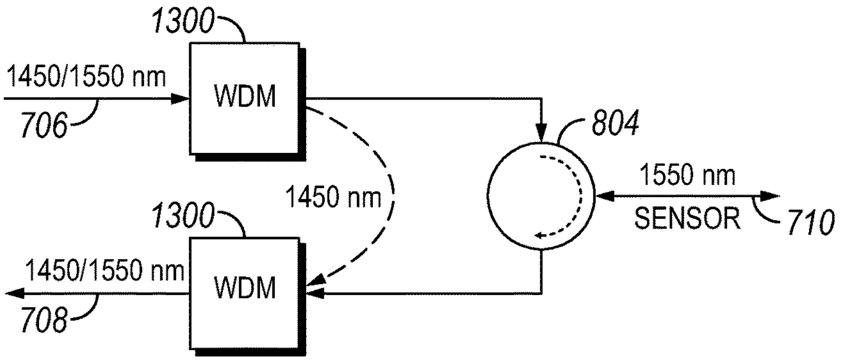
FIG. 13 illustrates the same functionality may be achieved by low loss fused fiber components and a circulator.

FIG. 13 illustrates the same functionality may be achieved by Low Loss Fused Fiber WDMs 1300 (referred to a fused fiber WDM 1300) and distal circulator 804. Although a fused fiber WDM is illustrated, any WDM may be utilized, such as a micro-optic WDM, splitter, and/or the like. Fused fiber WDMs 1300 added within an optical circuit may be used to steer pump laser light (e.g., 1450 nm) away from distal circulator 804 and a bidirectional downhole sensing fiber 710. A matched pair of fused fiber WDM 1300 may allow an effective pump light bypass to reuse excess remaining pump light along the return fiber 708 from transmission fiber 706. Thus, recirculation of high power pump light through return fiber 708, which may prevent potential high power pump light induced damage to distal circulator 804 and/or subsea and well head connectors. The 1450 nm Raman pump wavelength may e.g. experience maximum 0.3 dB optical attenuation through each fused fiber WDM 1300 for a total loss of less than 0.6 dB. Similarly, the 1550 nm signal may pass through distal circulator 804, thus experiencing about 2 dB less optical attenuation.

Figure 14:
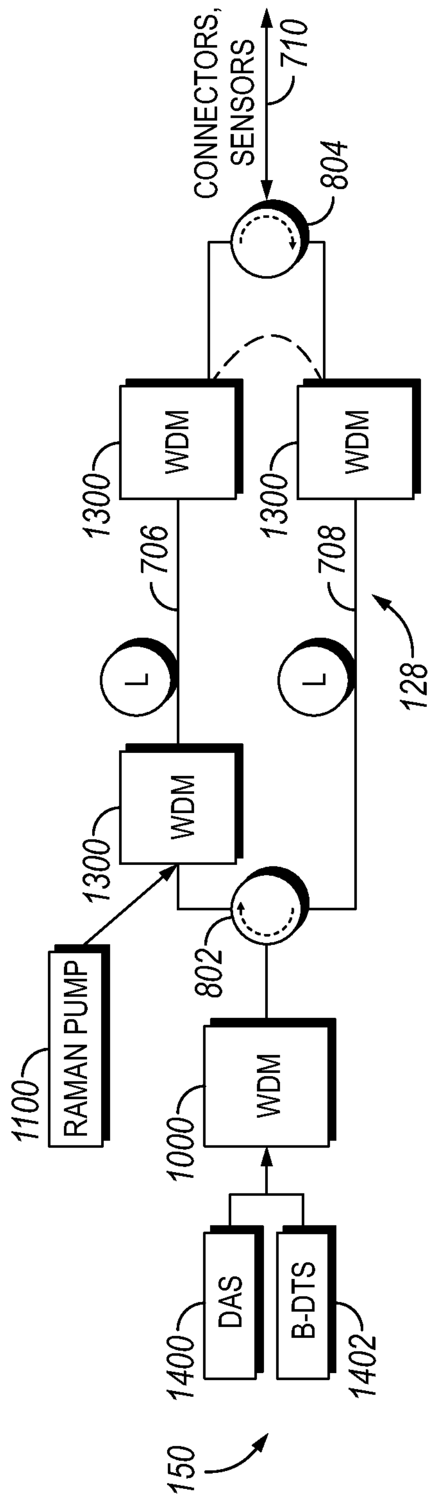
FIG. 14 illustrates an example of Raman amplification that utilizes two or more WDMs.

FIG. 14 illustrates an example of Raman amplification that utilizes two or more fused fiber WDMs 1300 with a Raman pump 1100 (as discussed above). Fused fiber WDMs 1300 are broadband WDMs which cannot support close channel spacing but provides relatively low optical attenuation. Additionally, FIG. 13 illustrates DAS system 150 connects transmission fiber 706 and return fiber 708 using proximal circulator 802 (e.g., referring to FIG. 8). Thus, fiber optic cable 128 is no longer de-coupled as discussed in FIGS. 9 and 10. Proximal circulator 802 is connected to a micro-optic WDM 1000, discussed above, which comprises interference optical filters which may accommodate very closely space optical channels or wavelengths on the order of 0.4 nm (50 GHz) spacing or better if/when needed. Fused fiber WDMs 1300 are in general lower loss components when compared with micro-optic WDM's 1000 and may handle higher optical powers without optically and/or thermally induced damage. Further, micro-optic WDM 1000 is connected to DAS 1400 and Brillouin DTS 1402.

Figure 15:
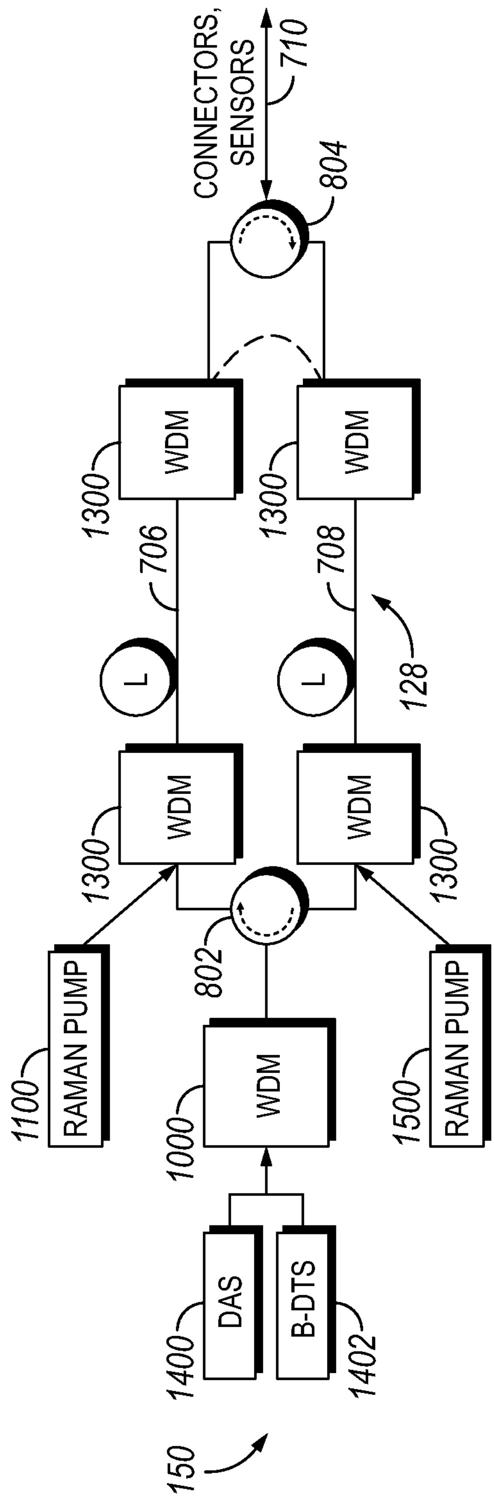
FIG. 15 illustrates another example in which a second set of Raman pumps on return fiber optic cable may be utilized.

FIG. 15 illustrates the example of FIG. 14 but further comprises a second Raman pump 1500 on return fiber 708, which may be utilized. The second Raman pump 1500 operates in a counter propagating mode, and the Distributed Raman Amplification (DRA) operates and functions as described above and below.

Figure 16:
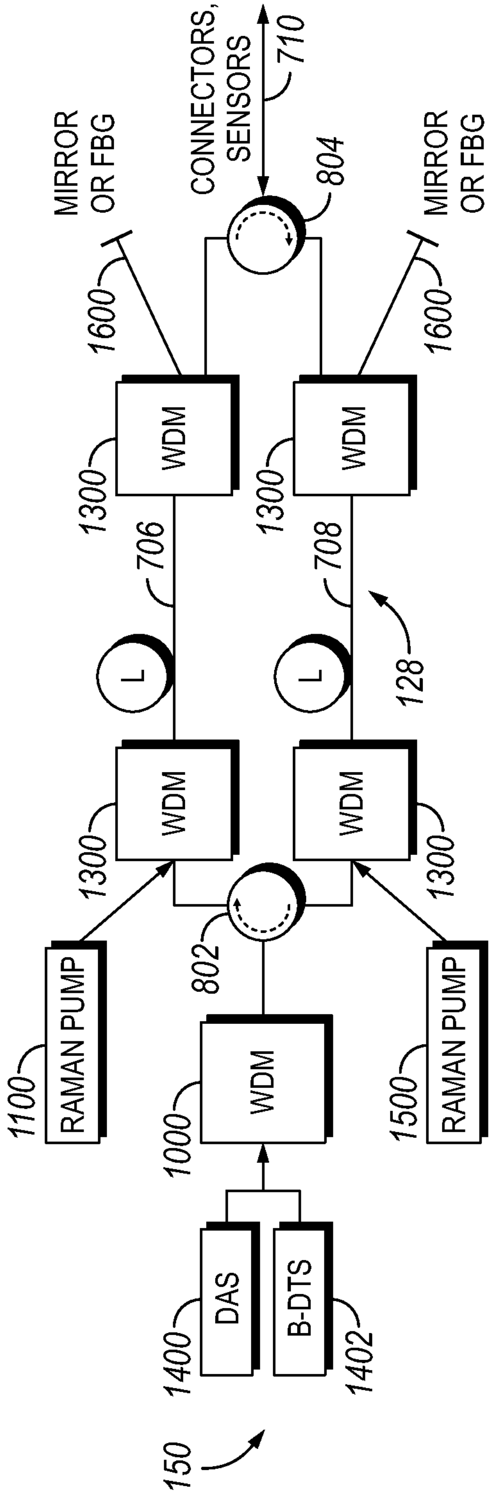
FIG. 16 illustrates an example to implement gain on both transmit fiber optic cable and return fiber optic cable.
Figure 17:
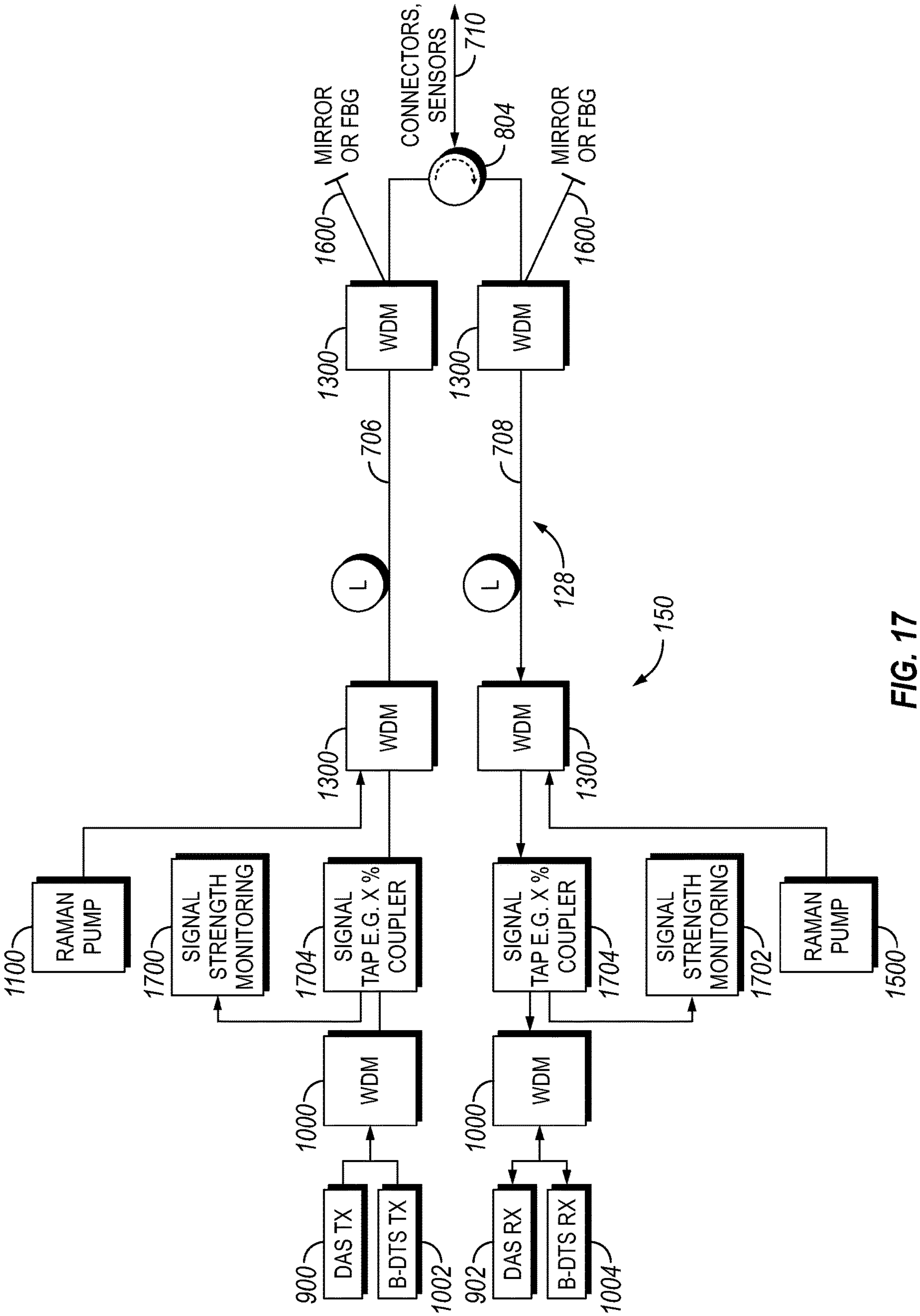
FIG. 17 illustrate an example that optimizes signal strength and gain levels throughout DAS system.

Further FIG. 16 illustrates the example of FIG. 15 but further comprises reflecting elements 1600. In this example, gain on transmission fiber 706 and return fiber 708 is created by reflecting the Raman power back into transmission fiber 706 or return fiber 708 using a suitable reflective element 1600. This may allow for independent control of the distributed Raman gain for transmission fiber 706 and return fiber 708, independently. As illustrated in FIGS. 16 and 17, reflective elements 1600 may be a part of or connected to fused fiber WDMs 1300. Fused fiber WDMs 1300 and reflective elements 1600 may allow recirculation of excess remaining pump light in reverse order through the same transmission fiber. In examples, reflective elements 1600 may be one or more mirrors and/or one or more Fiber Bragg Gratings (FBG). The mirror or FBG may be integrated into fused fiber WDM 1300 or connected externally to fused fiber WDM 1300 legs. Fused fiber WDM 1300 may prevent high power pump light from reaching distal circulator 804, which may prevent optical power damage to distal circulator 804 and/or subsea and wellhead connectors.

FIG. 17 illustrate an example that optimizes signal strength and gain levels throughout DAS system 150. As discussed above in FIGS. 9 and 10, fiber optic cable 128 is decoupled. Specifically, proximal circulator 802 is removed (e.g., referring to FIGS. 8 and 14-16). Additionally, all devices discussed in FIGS. 16 and 10 are utilized to function and operate as discussed above. Transmission fiber 706 fiber and return fiber 708 may be independently optimized. Optimizing may be performed to provide the best possible OSNR in DAS system 150. To perform this optimization in transmission fiber 706, signal strength monitoring module 1700 enables measurements of signal strength as a function of transmitted signal pulse power from transmitter 900 and/or Brillouin DTS transmitter 1002 and Raman pump power from Raman pump 1100 (aka distributed Raman Gain).

A signal strength monitoring module 1700 may function as an optical power meter of the backscattered light signals at the light frequencies utilized by DAS and DTS over distance. It may employ a number of opto-electronic components such as e.g., square-law photodetectors (to convert the back-scattered light into an electrical signal proportional to optical power), optical shutters (to restrict the measurement to certain portions of the transmission fiber e.g., close to WDM 1300), high speed digitizers (to sample the back-scattered light at a sufficiently high spatial sampling interval), etc.

For example, the signal strength monitoring module 1700 may be a photodiode or other similar opto-electric device where the optical energy may be converted to an electrical signal where the signal intensity, current or voltage is a measure of signal strength. Optional implementations include WDM's where individual optical wavelengths are separated in the optical domain and routed to individual wavelength dedicated opto-electric converters. Signal tap couplers 1704 may be used to enable signal strength monitoring of transmitted pulses from the sensing systems, back scattered light from transmission fiber 706 and return signals on return fiber 708. Signal strength monitoring modules may be calibrated over wavelength and/or optical power.

Raman pump lasers 1100/1500 may use an internal photodiode for output power monitoring, and this internal photo diode signal strength may be calibrated with pump laser power in order to enable control of individual pump lasers. This enables operation of individual pump laser wavelengths and thus enables gain shape control of a multi-wavelength DRA system. Individual signal wavelength strengths may then be measured with a signal strength module and individual Raman pump laser powers may be adjusted for a controlled Raman gain shape and optimum system level signal to noise properties when combined with individual signal laser power controls. Additional probe lasers may be included in the signal strength monitoring modules 1700 where probe lasers may be used to setup gain profiles and gain levels at specific wavelengths. Probe lasers may be optically connected (i.e., using optical couplers or WDMs) in close proximity of the signal strength monitoring where the probe lasers are used transmit a probe signal into the fiber used for DRA. The probe lasers may be at a wavelength substantially similar to the signal laser wavelength(s) or may be located at pre-determined wavelengths in close proximity to the signal laser wavelengths.

Transmitted signal pulse power that is too high for DAS system 150 causes non-linear penalties, thus the signal pulse power may be lowered to stay just below non-liner penalty levels. Additionally, too much Raman gain may amplify the signal which may provide a high signal pulse power and associated nonlinear effects. Signal strength monitoring module 1700 may be able to measure the backscattered Rayleigh signal strength over distance and may allow for optimizing DAS system 150 by adjusting the transmitted signal pulse power from transmitter 900 and/or Brillouin DTS transmitter 1002 and the Raman pump 1100 power to have the highest possible signal pulse power to reach downhole sensing fiber 710. Thus, optimizing maximizes signal pulse power from transmitter 900 and/or Brillouin DTS transmitter 1002 at the distal end of transmission fiber 706.

To perform this optimization in return fiber 708, the optimization looks at the amplification of the backscattered signal returning back to receiver 902 and/or Brillouin DTS receiver 1004 by changing the Raman pump 1500 power to a maximum level in order to get the best possible OSNR for both the DAS and BDTS systems Optimizing signal strength and gain levels may be performed by implementing monitoring elements. For example, an upper signal strength monitoring module 1700 may be used to monitor signal levels on the transmitted pulses as well as back scattered Rayleigh light as the transmitted pulses travel down transmission fiber 706. Signal strength monitoring module 1700 may monitor signal levels by connecting to transmission fiber 706 through signal tap coupler 1704. Signal tap coupler 1704 may be a fused fiber device where a small portion of the optical signal is diverted from the main optical path. For example, 95-99% of the optical signal may pass from fused fiber WDM 1300 through signal tap coupler 1704 to micro-optic WDM 1000 and the remaining 1-5% may be diverted to signal strength monitoring modules 1700/1702. Reviewing the signal levels allow a user to determine if the path is optimized or may need to be adjusted, as discussed above. Signal tap coupler 1704 may be made with any pass thru/tap ratio, and the numbers above are general guidelines as other split rations and devices may be used to achieve similar functions.

The Raman pump power and individual pump laser powers may then be adjusted to keep the transmitted pulse power within a desirable amplitude band such that the downward propagating signal is kept within desirable limits to minimize non-linear signal degradation and optimize signal strength in downhole sensing fiber 710. Lower signal strength monitoring module 1702 may be used to monitor the return signal strength. As illustrated, lower signal strength monitoring module 1702 may connect to return fiber 708 through signal tap coupler 1704. Raman pump power may be adjusted to keep the back-scattered light within a desirable amplitude band so that the return signal may be amplified for optimum signal strength while avoiding damage to optical components in the system. An optional signal source may be added into this block in order to provide a probe signal that may be pulsed on demand in order to measure the back scattered Rayleigh signal along fiber optic cable 128 in order to determine the Raman gain along fiber optic cable 128. This architecture may then be used to monitor signal strength levels across DAS system 150 in real-time. Additional signal processing may also be done on the detected signal and various quality metrics such that various power condition routines may be implemented, for example, periodically vary the transmitted signal strength and measure impact on signal quality or periodically vary the Raman pump power and measure impact on signal quality and/or the like.

Figure 18:
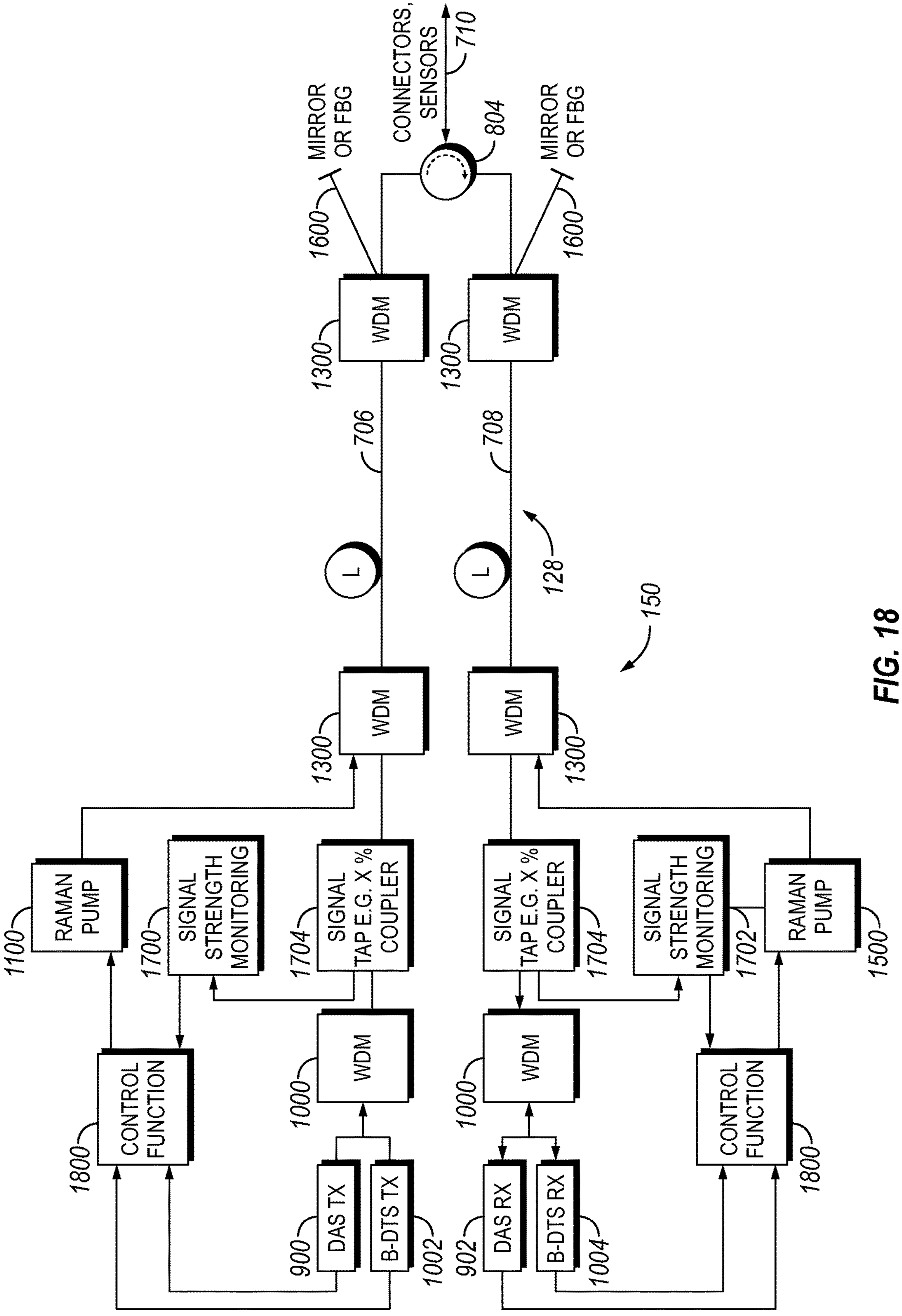
FIG. 18 illustrates a schematic of possible methods utilizing Control Functions.

FIG. 18 illustrates an example of DAS system 150 that comprises all devices of FIG. 17 and further comprises an information handling system 130 (e.g., referring to FIG. 1) that may implement a Control Function 1800. It should be noted that there may be multiple information handling systems 130 performing multiple Control Function 1800 or a single information handling system 130 performing Control Function 1800. Additionally, while two boxes are illustrated for Control Function 1800 in FIG. 18, and Figures below, there may be a single Control Function that operates on one or more information handling systems 130 to control DAS system 150. As illustrated, inputs to Control Function 1800 may come from Brillouin DTS transmitter 1002, transmitter 900, Brillouin DTS receiver 1004, receiver 902, and/or one or more signal strength monitoring modules 1700, 1702.

Figure 29:
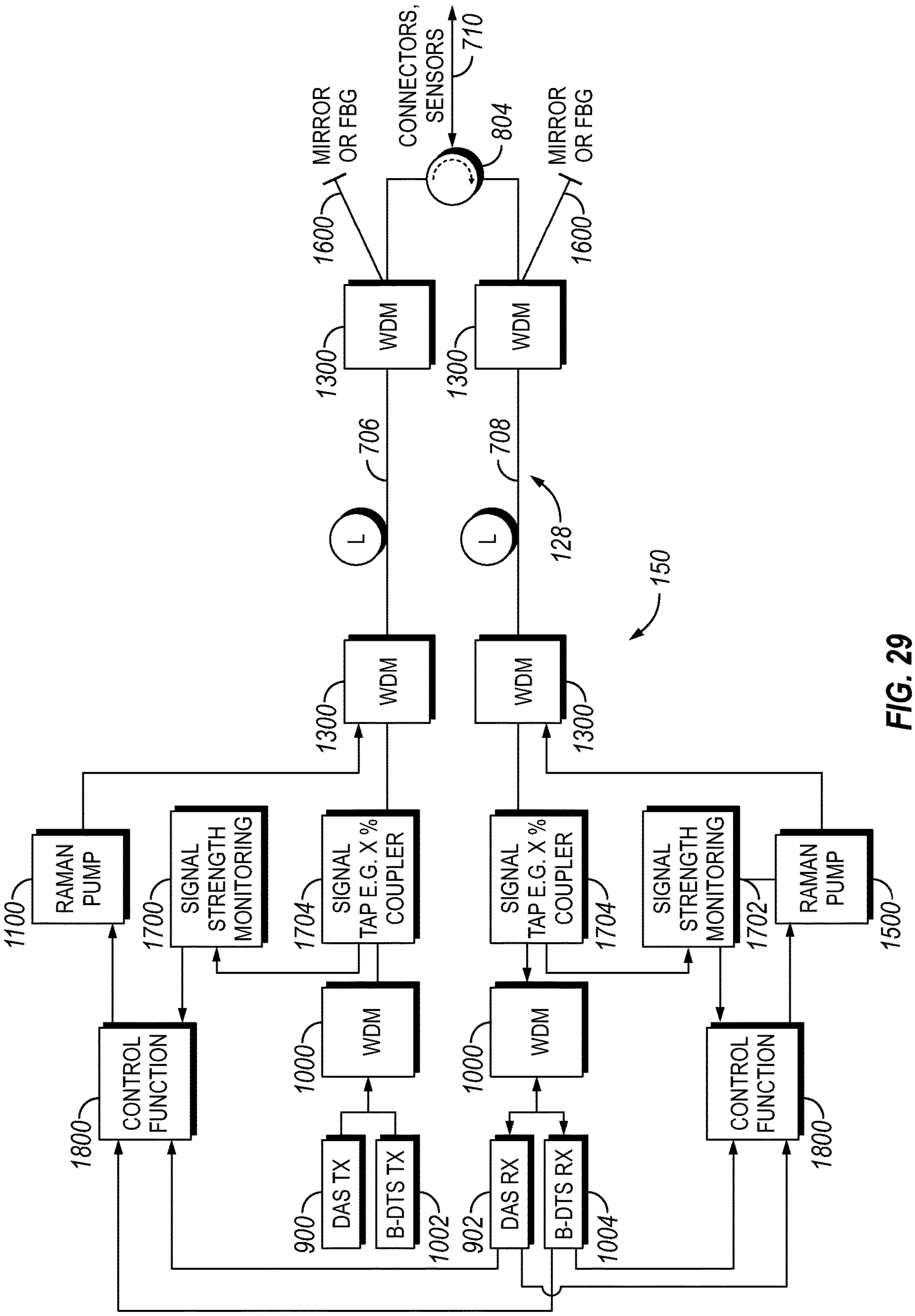
FIG. 29 illustrates another example of FIG. 18 utilizing one or more Control Functions.

Control Function 1800 operates and functions to provide feedback in a control loop to automatically adjust pump laser current based on a predetermined optimal amplified signal return without under or over amplification. Raman pump power levels and transmitted sensing system pulse power may be controlled based on pre-determined limits and/or real-time feedback from calculated parameters such as system noise floor, optical signal to noise, signal distortion, non-linearity, and/or the like. This is effectively an Automatic Gain Control for stabilized return signal levels for optimized signal-to-noise ratio. FIG. 29 illustrates another example utilizing Control Functions 1800. DAS data (upper and lower) may be examined directly for (interferometric) self-noise at desired locations. Both of these "noise" terms may be normalized to defined bandwidths and given respective weightings by algorithms implemented in Control Functions 1800. Another form of calibrating Raman Pumps may be to configure the Raman pumps such that the intensity of the DAS/DTS backscattered light returning from the distal end of downhole sensing fiber 710 is maximized. This data combined with the signal strength monitors may be processed in Control Functions 1800 to control the Raman pumps for optimal system performance. Signal strength monitors may house optics like e.g., Wavelength Division Multiplexers (WDMs) where signals may be split into different wavelength bands thus enabling individual laser wavelength monitoring where each wavelength may be coupled to individual photo-detectors and associated analog-to-digital signal conversion and communication with Control Functions 1800. Pilot tones via AM (amplitude modulation) or Angle modulation (frequency or phase modulation) of the pump light may be injected to enable more precise Phase locked Loop (PLL) control of Raman gain.

Figure 19:
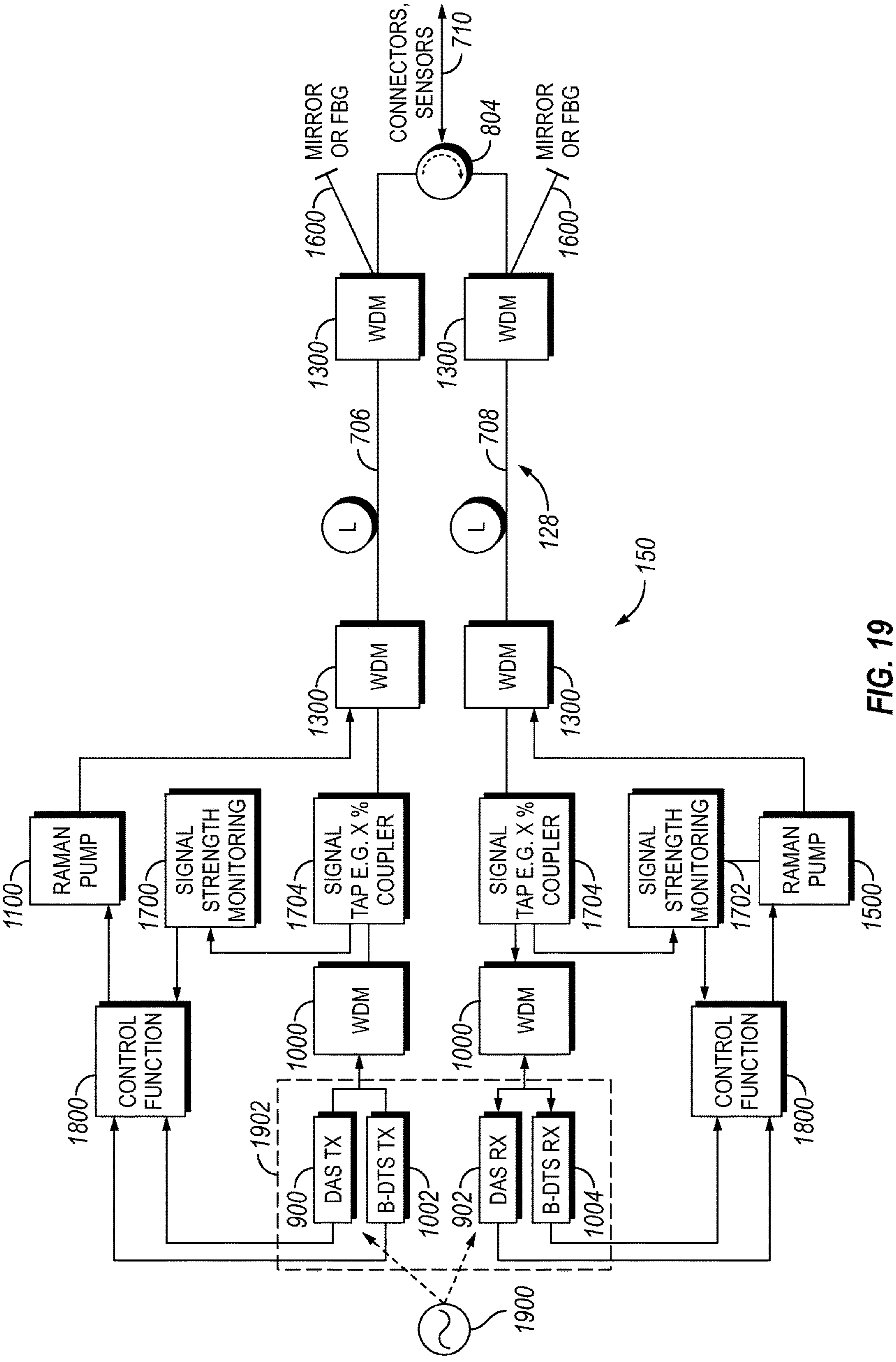
FIG. 19 illustrates an example in which active test signals from a signal generator may be applied to DAS Interrogators.

FIG. 19 is an example that utilizes all the devices from FIG. 18 and further comprises a signal generator 1900 that may operate and function to produce active test signals to be applied to DAS Interrogator 1902 for more comprehensive evaluation of signal quality metrics. For example, a signal generator 1900 producing a dynamic voltage signal to DAS interrogator 1902 and applying that signal to a calibrated optical phase modulator located in the optical chain responsible for recombination of the optical signals that comprise the interferometer. This may cause a high-quality phase modulation directly proportional to the voltage signal created by signal generator 1900. This phase modulation superimposes the DAS sensed signals at every location of fiber optical cable 128 (sensor and leads as applicable). The control function may process these superimposed DAS signals to assess the dynamic signal quality metrics related to frequency response (or frequency dependent scale factor), dynamic range, and linearity (distortion) at desired locations. Other means of generating control signals and/or signal strength variation within DAS system 150 may comprise varying Raman pump power and/or interrogator and/or probe signal strength periodically or on demand in order to gain system level insights used for control and optimization. DAS system 150 signals and probe signals may operate at different wavelengths thus enabling characterization of wavelength dependent gain and optimization for each wavelength independently in a multi-wavelength system. The systems and methods described above may be applied to any of the Figures discussed above or below where sensing of signals and controls may be shown and/or described.

Figure 20:
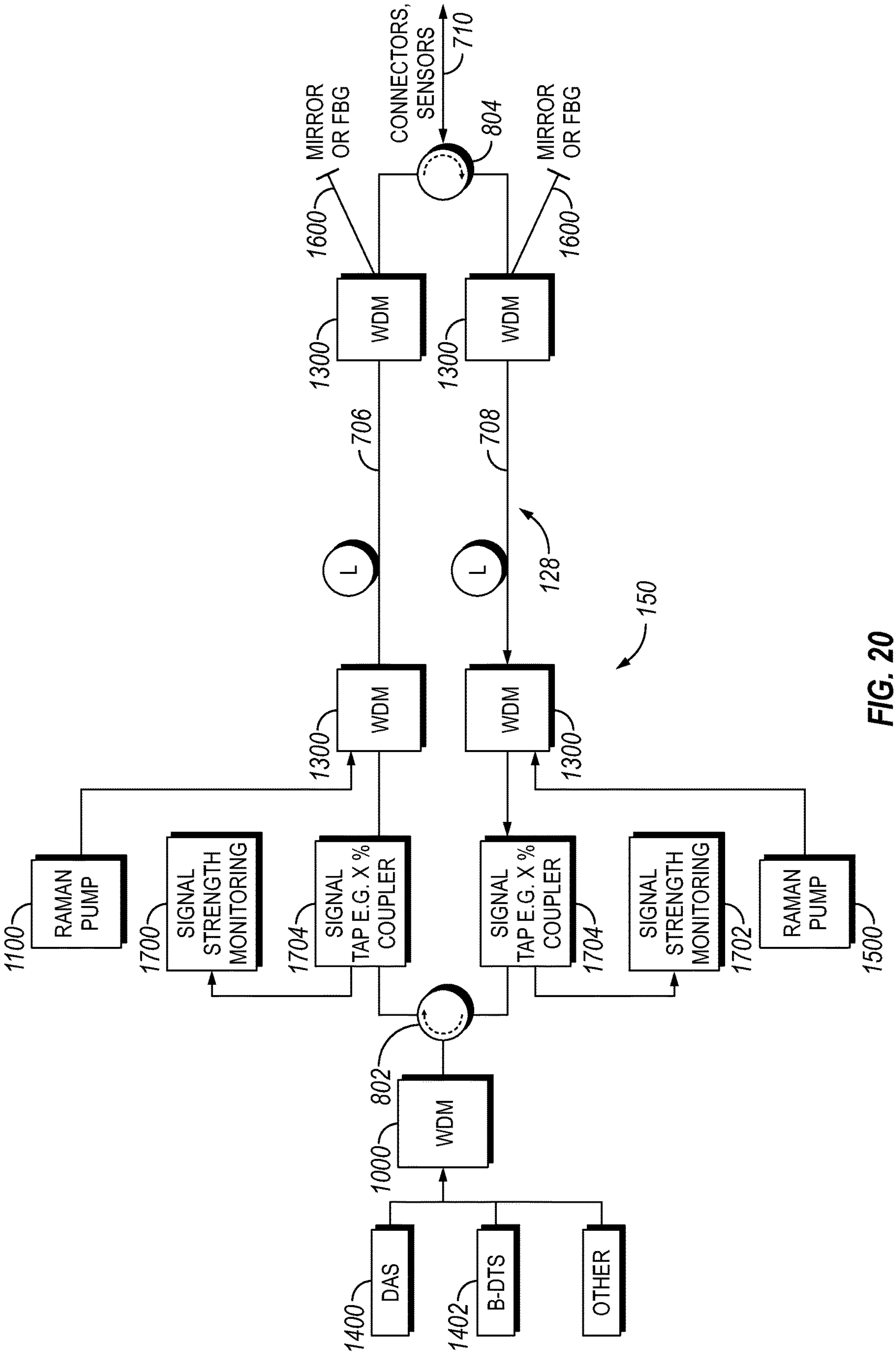
FIG. 20 illustrates a DAS system configuration that combines properties from FIG. 14-19.

Additionally, FIG. 20 illustrates an example that comprises the devices and scope of each FIG. 14-16 described above where fiber optic cable 128 is coupled using proximal circulator 802. As illustrated, proximal circulator 802 may connect fiber optic cable 128 to micro-optic WDM 1000, which may operate and function as descried above. In other examples to extend fiber optic cable 128 effective range may be utilizing any fiber optic-based sensor. For example, Fiber Bragg Grating (FBG) based sensors that may be multiplexed using wavelength division multiplexing or time division multiplexing, Fabry-Perot point or multi-point sensors and other sensing principles.

These sensors may affect the distributed gain with Raman amplification by propagating high optical power in the same fiber optic cable 128 as the signals selected for amplification. The Raman amplification happens over a 10's of km's of fiber length and the Raman pump wavelength may be spaced apart from the signal wavelength in the wavelength domain. The Raman gain peak is about 13 THz away from the pump laser at 1450 nm, which equals to around 100 nm to provide peak gain at around 1550 nm. Raman gain is polarization dependent, and it is desirable to de-polarize the Raman pump sources to avoid polarization dependent signal gain. Depolarization may be done by Lyot de-polarizers or may also provide similar pump power at orthogonal pump polarization states using a polarization multiplexer or a polarization beam combiner.

Figure 21:
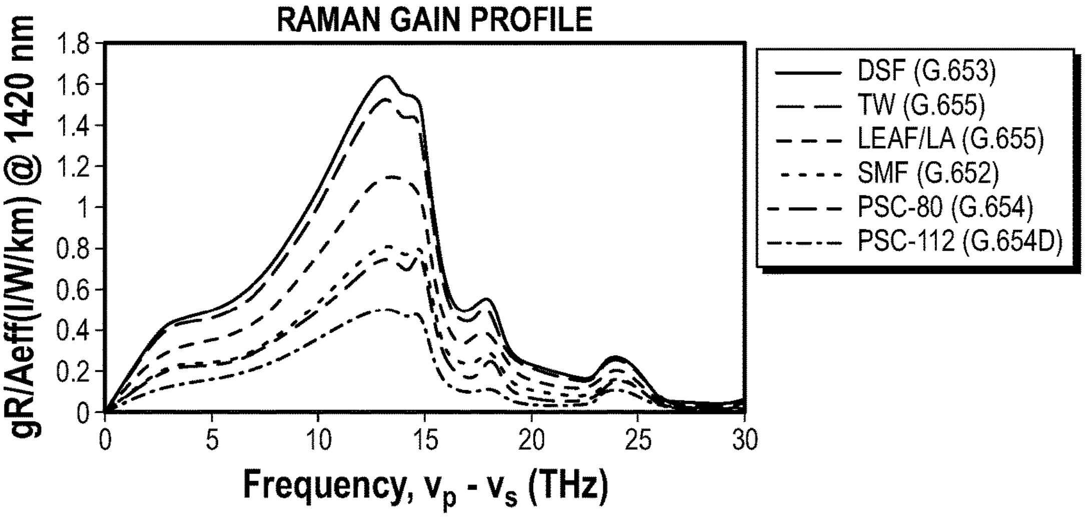
FIG. 21 illustrates a graph of a Raman gain shape that may be fairly wide and dependent on fiber optic cable.

FIG. 21 illustrates a graph of a Raman gain shape that may be fairly wide and dependent on fiber optic cable 128 (e.g., referring to FIG. 19), or more precisely the glass chemistry in the core of the optical fiber in transmission fiber 706 and return fiber 708 (e.g., referring to FIG. 19). The peak gain in the graph of FIG. 21 is located at about 13 THz, which at these wavelengths translates to about 100 nm wavelength shift. For example, a Raman pump 1100, 1500 (e.g., referring to FIG. 19) at 1450 nm may provide gain at 1550 nm over a length of fiber optic cable 128. In another example, the Raman pump wavelengths may be spaced across a wavelength range in order to support signal gain at various distances. This may be done by having a Raman pump 1100, 1500 placed at 1350 nm in order to provide gain to a Raman pump source placed at 1450 nm such that the 1450 nm source may provide gain to a 1550 nm signal while the 1450 nm pump source is being replenished by the 1350 nm Raman pump. The actual pump wavelengths may deviate from the example above as the example show 100 nm separation which may not be the most power efficient implementation. Different pump power at different wavelengths may also be used to control the Raman gain shape to compensate for system dependent signal losses.

Figure 22A:
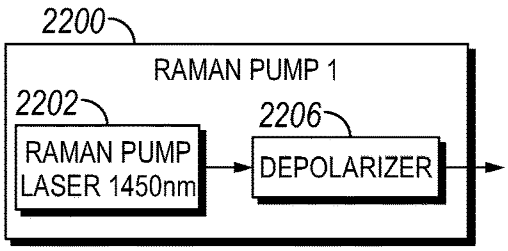
FIG. 22A-22C illustrate different forms of Raman Pumps.
Figure 22B:
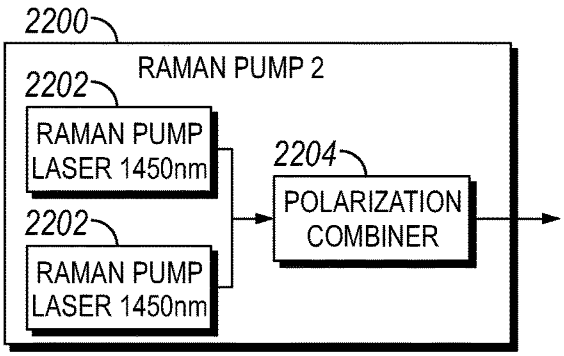
Figure 22C:
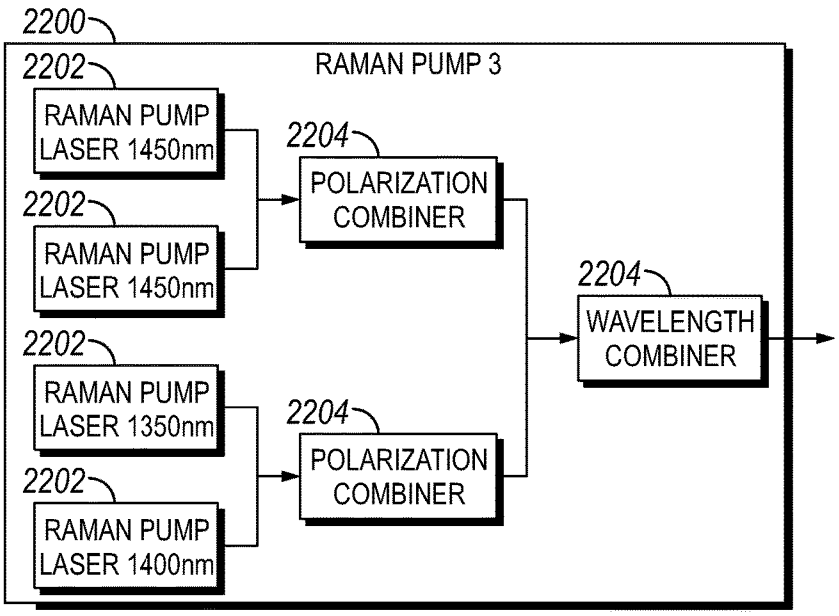

FIGS. 22A, 22B, and 22C illustrates Raman Pump module 2200. It is understood that the Raman pump module 2200 may have one or more pump lasers 2202 at similar or different wavelengths where pump lasers 2202 may be combined with a polarization combiner 2204. A polarization combiner 2204 may comprise wavelength multiplexers, wavelength combiners and/or polarization beam combiners. Raman pump module 2200 may comprise de-polarizers 2206 or means to combine pump laser power from multiple pump lasers and/or control individual pump laser powers with the objective of controlling/minimizing polarization dependent gain due to Raman amplification contribution from individual pump lasers while meeting overall gain targets for the selected span. Each individual pump laser 2202 may be wavelength locked using one or more Fiber Bragg Gratings (FBGs) to ensure stable wavelength during operation across a large operating envelope where the output fiber from the laser may be a Polarization Maintaining (PM) fiber. Pump lasers 2202 may house an internal Photo Diode (PD) and/or a thermistor for monitoring operation and feedback control, and the pump laser assembly may comprise a Thermo-Electric Cooler (TEC) for temperature control. Individual pump lasers 2002 within a Raman pump module 2200 may be controlled independently for safe operation and in order to provide expected signal gain as a Raman pump module 2200 for a given signal wavelength, and multiple pump lasers 2202 within a Raman pump module 2200 may be varied to minimize polarization dependent gain variation while meeting expected signal gain needs. Gain variations across wavelength and amplitude of individual signal wavelengths within DAS system 150 may be monitored and optimized by varying pump laser settings within a Raman pump module 2200.

Figure 23:
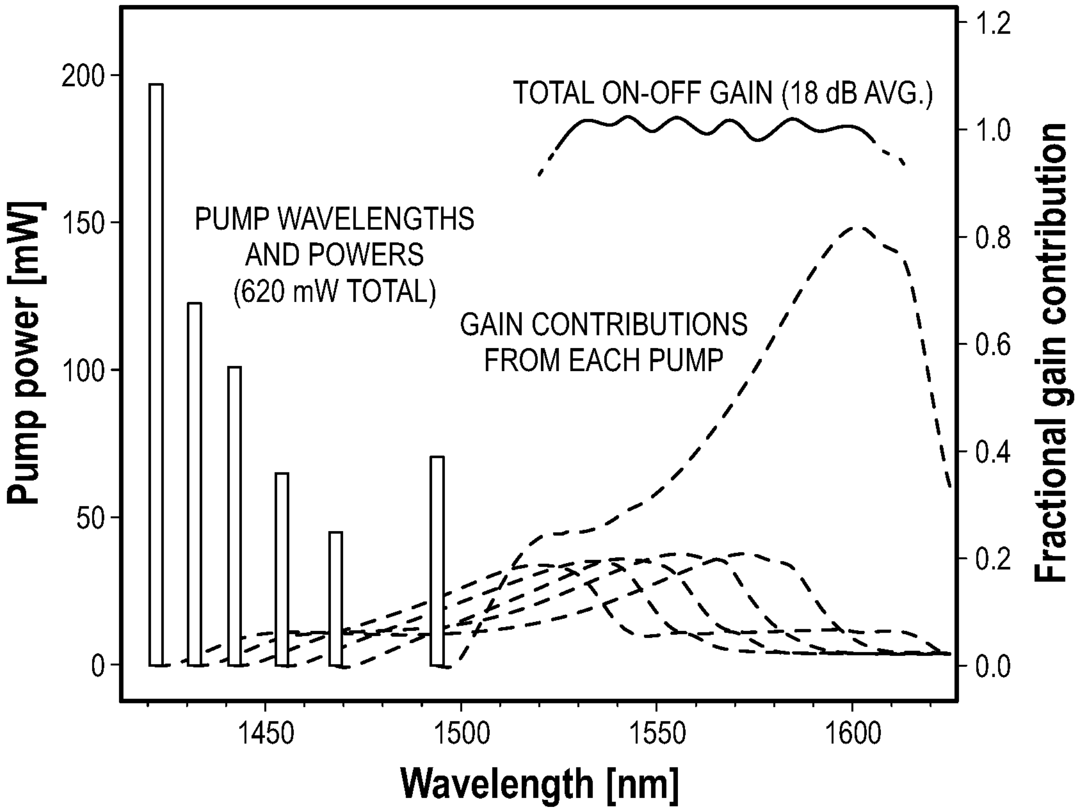
FIG. 23 illustrates an example with six pump wavelengths targeting a flat signal gain in a window up to 1600 nm.

FIG. 23 illustrates an example with six pump wavelengths targeting a somewhat flat signal gain in a window in the 1550 nm to 1600 nm region. The gain contribution from each laser adds to provide a total on-off gain, and any signals in the Raman gain window may be amplified so even pump lasers at different wavelengths gets amplified. The different pump wavelength selection and power would be tailored to provide the desired gain and gain shape at target wavelengths based on the selected sensor systems and system architecture. Referring back to FIGS. 22, in examples, pump lasers 2202 may be utilized in various combinations to achieve the desired gain over a selected signal fiber span length. Longer fiber lengths would benefit from using more pump laser wavelengths spaced further apart to allow for a suitable Raman optical fiber interaction length to provide signal gain further along the fiber. Raman gain occurs over fiber interaction lengths where the fiber lengths normally range from a few km's to more commonly 10's of km. Pump powers may be ranging from a few 10's of mW (milliwatts) to several 100's of mW per wavelength with a total combined optical power of up to 600-1200 mW for single mode Raman Pump modules. The pump power may be significantly more in selected cases where large core fibers may be used.

Figure 24:
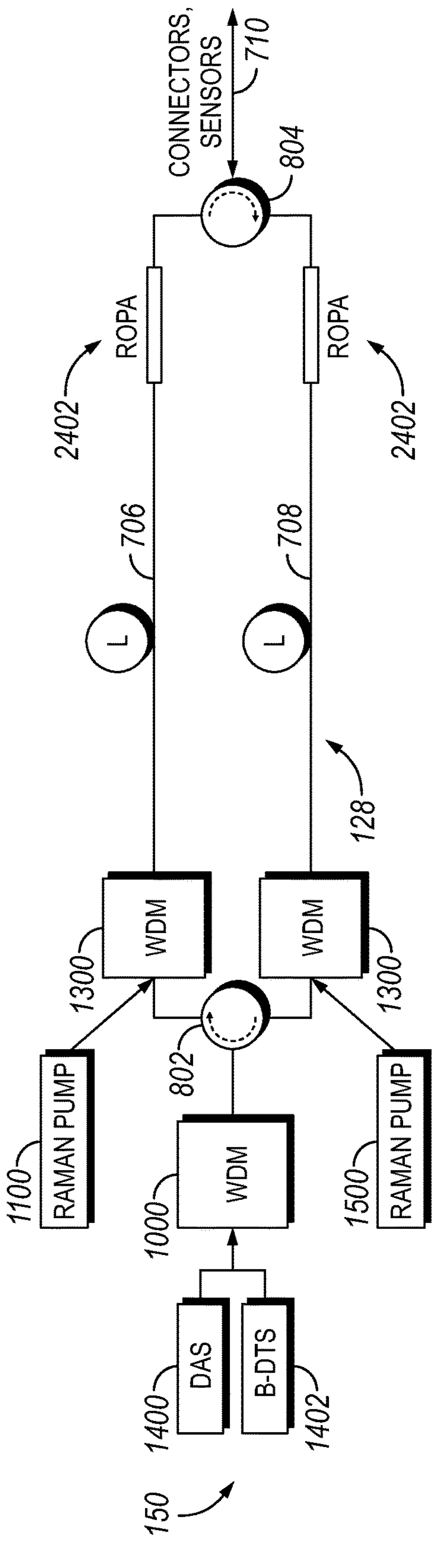
FIG. 24 illustrates examples in which circulators and connectors add point losses.

FIG. 24 comprises all device from DAS system 150 in FIG. 20. FIG. 24 illustrates examples in which distal circulator 804 and connectors add point losses. In examples, point losses may be overcome by including deployment of one or more Remote Optically Pumped Amplifiers (ROPA) 2402, which may or may not utilize electrical power. In examples, ROPAs 2402 may further comprise of Erbium Doped Fiber Amplifiers (EDFAs). As illustrated ROPAs 2402 may be disposed on transmission fiber 706 or return fiber 708. ROPAs 2402 (i.e., EDFAs) that may utilize electrical power may then need electrical cables and infrastructure which may be prohibitive in terms of cost and complexity. In examples, EDFs that may be added to the architecture may be remotely pumped with a 1480 nm Raman pump light or other suitable wavelength based on the selected EDF. Gain realized from ROPA 2402 may be dependent on the pump power, pump wavelength and the EDF characteristics as well as the total length of a selected EDF. ROPA's 2402 may reduce system cost and complexity while providing remote point gain. Additionally, ROPA's 2402 and other components such as fused fiber WDM's 1300 (e.g., referring to FIGS. 13-20) and circulators may be housed in flying leads or other subsea components that may be replaced using Remotely Operated Vehicles (ROVs) in case additional gain is utilized. Components and sub-systems may be housed in connectorized assemblies enabling replacement and/or system upgrades using e.g., ROV's.

Figure 25:
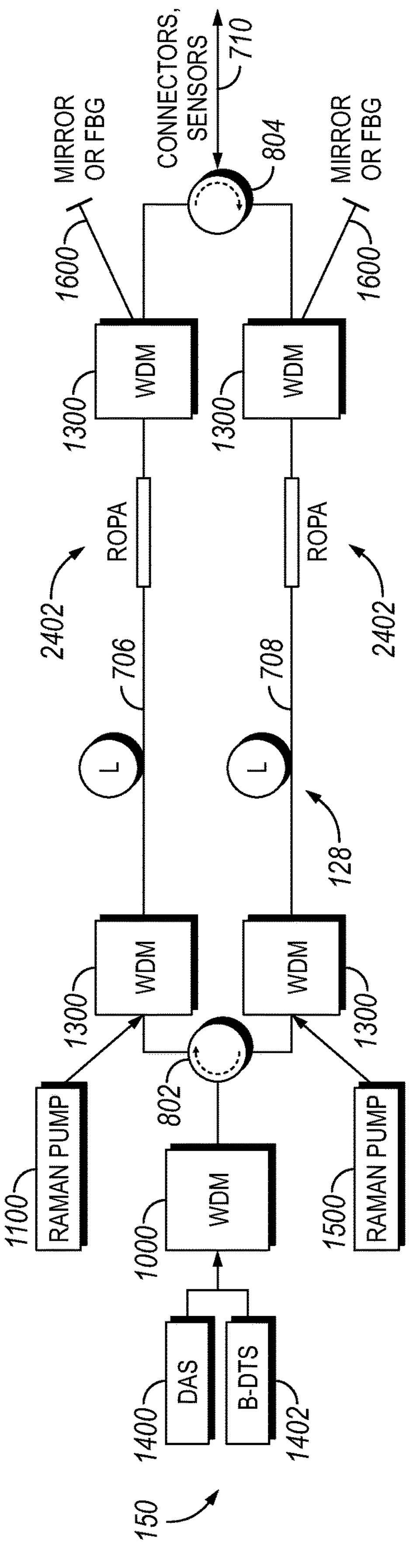
FIG. 25 illustrates an example that may balance the distributed Raman gain.

FIG. 25 illustrates an example that utilizes all devices disclosed in FIG. 24 and may further comprise reflective elements 1600. DAS system 150 illustrated in FIG. 25 may balance the distributed Raman gain and the gain from ROPA 2402. This may be performed by designing DAS system 150 to always have a fixed amount of gain from the EDF regardless of Raman pump power such that the ROPA gain may be used to overcome connector and component losses and the Raman gain may be used to for system level gain control.

These methods may be achieved by characterizing the EDF saturation properties where the gain and pump power absorption is measured. A fully pump saturated EDF may produce a fixed amount of gain per unit length while allowing the excess pump power to pass through. The gain from a length of fiber will then be constant across a range of pump power while allowing the remnant optical pump power to pass through. The architecture above, with a carefully selected length of EDF, would thus satisfy a fixed gain need across a variety of Raman pump powers once a certain Raman pump power threshold has been reached. The Raman pump power may then be used to control the transmission fiber gain while having a constant step gain similar to the expected component and connector attenuation around the well head.

It is also desirable to limit the optical power reaching free-space optical components, reflective elements 1600, with lens arrangements and optical connectors in order to reduce the risk of thermal damage. This may also be performed by using the fused fiber WDM 1300 to filter out and reflect Raman pump power and other filters and/or WDMs may be used to filter out excess optical power close to the signal bands. Various notch filters and/or Amplified Spontaneous Emission (ASE) filters may be added as needed.

Figure 30:
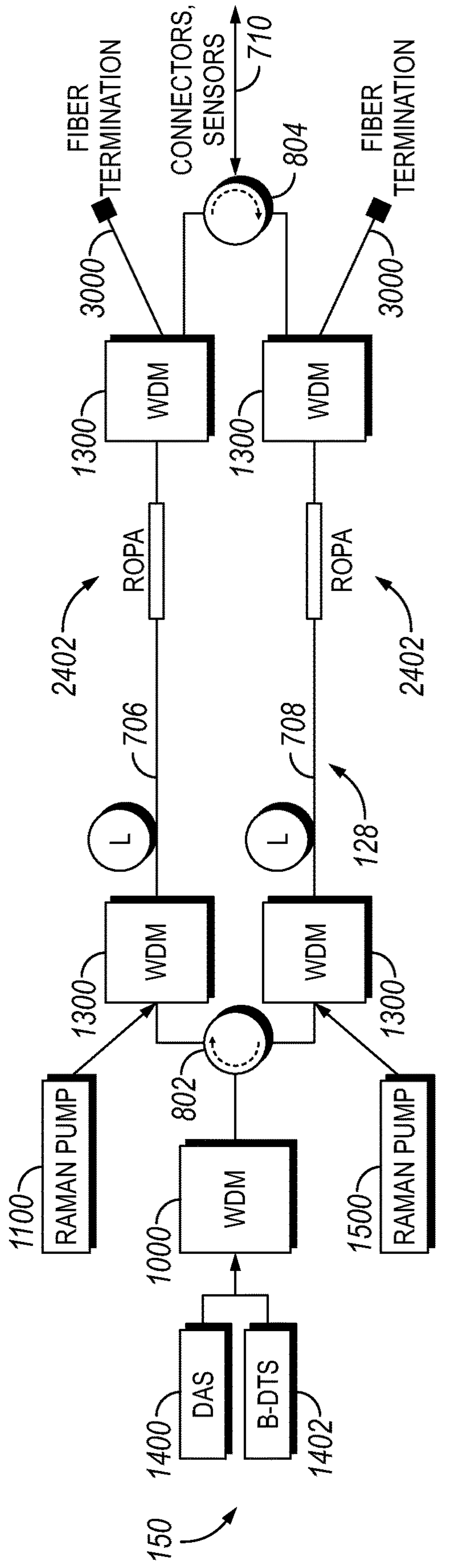
FIG. 30 illustrates another example of FIGS. 16-18, 19, 20 and 25 where one or more reflective elements are replaced with one or more dissipative element.

FIG. 30 illustrates another example of FIG. 25, including all devices discussed in FIG. 25. As illustrated, reflective elements 1600 may be replaced by dissipative elements 3000 and connected to fused fiber WDM 1300. In this example, dissipative element 3000 dissipates any excess optical power occurring at frequencies outside the signal bands used by DAS, DTS, DSS and the like, without reflecting any of the excess optical power back into transmission fiber 706 or return fiber 708. Dissipative element 3000 may comprise of coreless termination fiber, fiber end caps or any other optical element or combinations of elements that may operate to dissipate light without introducing strong back-reflections at a fiber-air interface. Note that reflective element 1600 may also be replaced with dissipative element 3000 in FIGS. 16 to 20 and 25 without departing from the scope of the present disclosure.

Large mode field or Large Effective Area fibers (LEAFs) have been developed for long haul repeaterless subsea transmission to minimize the need for active amplifier stations along the seafloor and to eliminate or to minimize non-linear multiwavelength optical signal interaction (aka crosstalk) effects along the fiber length. LEAF fibers effectively allow high power optical transmission due primarily to reduced optical power density across the mode field diameter within the fiber optic waveguide core guidance region. Aforementioned non-linear effects may comprise Stimulated Raman Scattering (SRS), Stimulated Brillouin Scattering (SBS), Self-Phase Modulation (SPM), Cross-Phase Modulation (XPM), and/or Four-Wave Mixing (FWM). As such, reduced power density effectively also allows an increased optical transmission power from pump lasers without approaching power damage threshold at glass fiber end faces and/or micro-optic elements. A person skilled in the art recognizes that the fiber in the umbilical and flowline may have different properties than the downhole sensing fiber.

Amplification methods of DAS system 150 may be utilized to increase the length of fiber optic cables 128. Remote signal amplification in the 1550 nm band may be realized using various methods. As previously pointed out, Raman laser pump light, typically at shorter wavelengths (higher photon energies) or perhaps near 1450 nm, may be transmitted along the primary transmission fiber where, via non-linear Raman scattering, energy from the shorter pump wavelengths is coupled into the longer 1550 nm band signal wavelengths to produce effective gain.

Laser pump light may be made to propagate in the same direction as the outgoing 1550 nm probe signal (co-propagation) or it may propagate in the opposite direction to the 1550 nm probe signal (counter-propagation). In many instances, counter-propagation may exhibit higher energy transfer efficiency.

Figure 26:
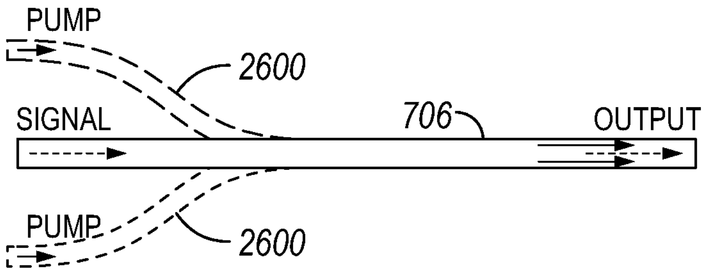
FIG. 26 illustrates an example in which multiple short-wave Raman pump lasers may be combined onto the common single mode transmission.

Optical pump power transmission via ancillary multimode fibers of DAS system 150 may be utilized to increase the length of fiber optic cables 128. Optical pump power may be separately transmitted via multimode transmission fibers 706 to remote EDF amplifier nodes where tap WDM couplers may be fed to the local EDF modules for localized pumping and amplification. Multiple pump lasers may be located at the surface and their powers combined via special Pump Signal Combiners to effectively sum multiple pump diode laser source powers onto a common large core multimode transmission fiber for pump light distribution along the signal path for periodic tapping where needed. Alternatively, FIG. 26 illustrates an example in which multiple shortwave Raman pump lasers 2600 may be combined onto the common single mode transmission fiber 706 to provide a continuum of Raman gain along said single mode transmission fiber 706, as described above.

Figure 27:
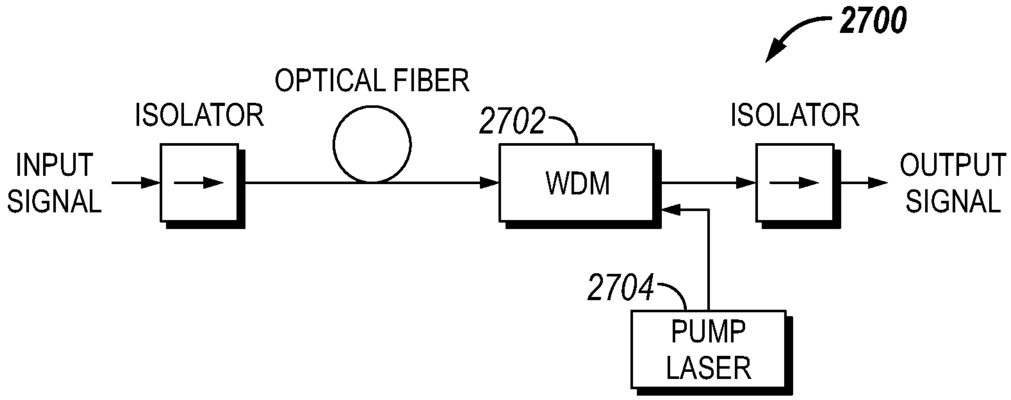
FIG. 27 illustrates a schematic of a single pump diode counter-pumped transmission fiber.
Figure 28A:
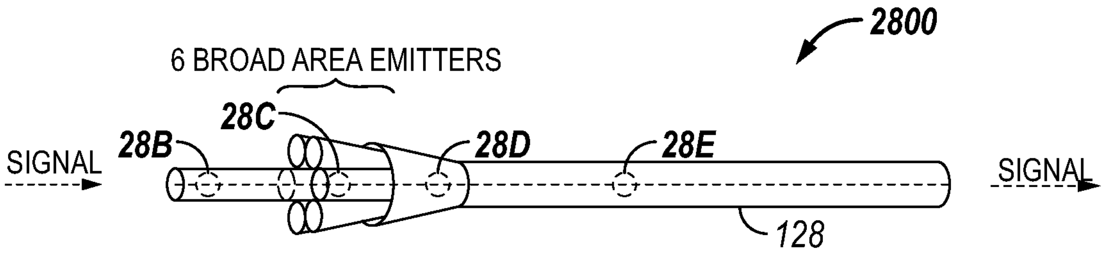
FIGS. 28A-28E illustrate cladding pumped fiber amplifiers.
Figures 28B, 28C, 28D, 28E:
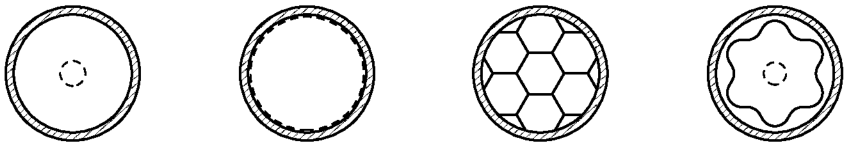

FIG. 27 illustrates a schematic of a single pump diode counter-pumped transmission fiber 2700. In examples, single pump diode counter-pumped transmission fiber 2700 may allow for reverse pumping based signal amplification whereby the signal direction and pump directions are opposite and optical isolators and remote WDMs 2702 may prevent pump light from reaching the signal transmitter. In this example, pump laser 2704 may be located at the surface instrument where a second LEAF single mode fiber or multimode fiber conveys pump light from the pump laser to the remote (WDM) 2702. In this case both transmission and pump fibers are separate. In examples, the pump light fibers do not have to run in parallel to the transmission fibers and do not need to be colocated with the surface instrument, but may be located elsewhere.

FIGS. 28A-28E illustrates cladding pumped fiber amplifiers 2800 that may be coupled and combine multiple shortwave Raman pump lasers onto a common LEAF single mode transmission fiber to generate gain along the length of fiber optic cable 128. FIGS. 28B-28E are different cross sections of fiber optic cable 128. The systems and methods for a DAS system 150 (e.g., referring to FIG. 1) within a subsea environment may comprise any of the various features of the systems and methods disclosed herein, including one or more of the following statements.

Figure 31:
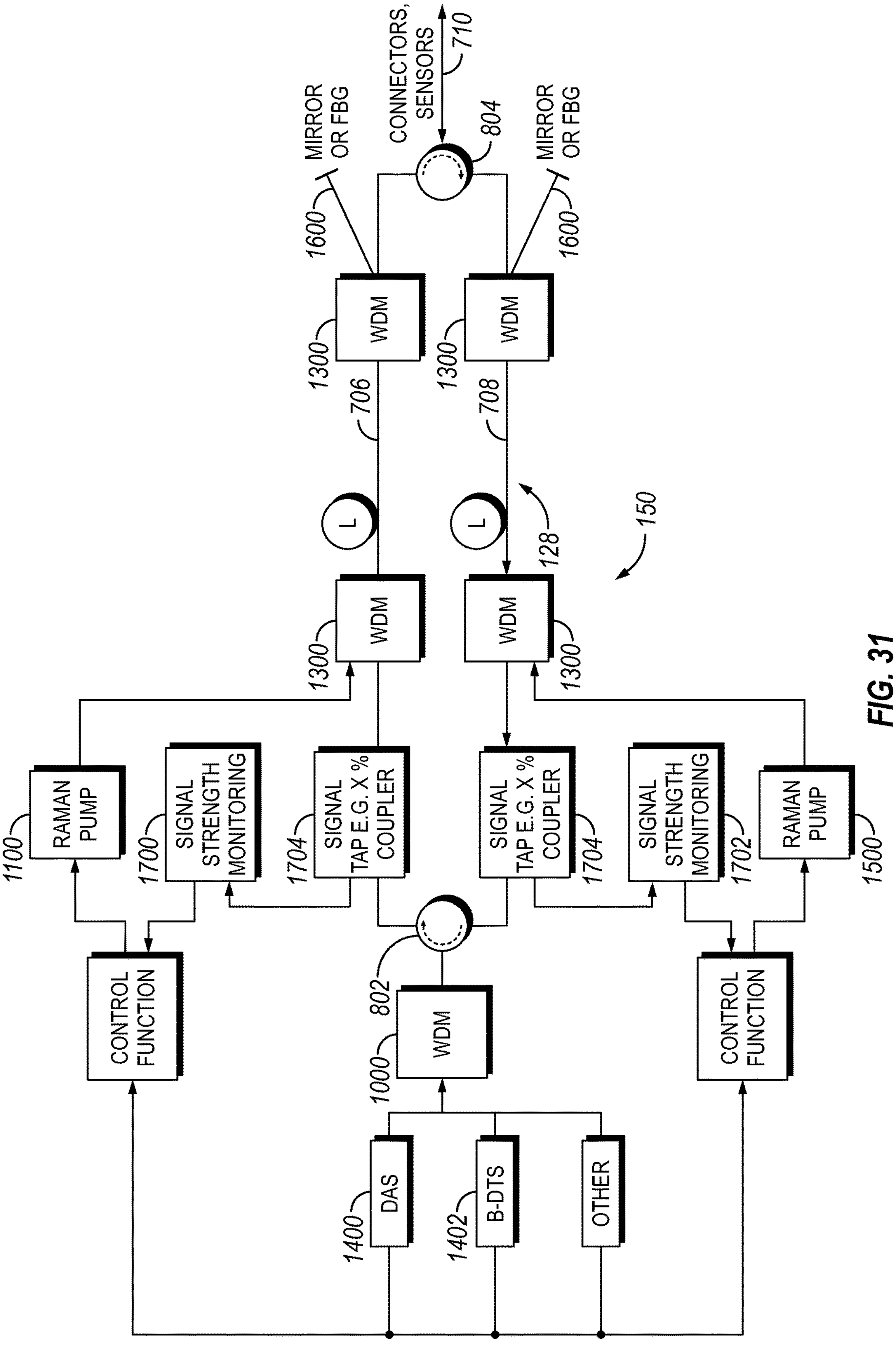
FIG. 31 illustrates another example of FIGS. 16-18, 19, 20 and 25 utilizing a one or more Control Functions.

Additionally, FIG. 31 illustrates another example of FIG. 20, which comprises the devices and scope of each FIG. 14-16 described above where fiber optic cable 128 is coupled using proximal circulator 802. As illustrated, proximal circulator 802 may connect fiber optic cable 128 to micro-optic WDM 1000, which may operate and function as described above. In other examples to extend fiber optic cable 128 effective range may be utilizing any fiber optic-based sensor. For example, Fiber Bragg Grating (FBG) based sensors that may be multiplexed using wavelength division multiplexing or time division multiplexing, Fabry-Perot point or multi-point sensors and other sensing principles.

These sensors may affect the distributed gain with Raman amplification by propagating high optical power in the same fiber optic cable 128 as the signals selected for amplification. The Raman amplification happens over a 10's of km's of fiber length and the Raman pump wavelength may be spaced apart from the signal wavelength in the wavelength domain. The Raman gain peak is about 13 THz away from the pump laser at 1450 nm, which equals to around 100 nm to provide peak gain at around 1550 nm. Raman gain is polarization dependent, and it is desirable to de-polarize the Raman pump sources to avoid polarization dependent signal gain. Depolarization may be done by Lyot de-polarizers or may also provide similar pump power at orthogonal pump polarization states using a polarization multiplexer or a polarization beam combiner.

Further illustrated in FIG. 31 are one or more utilizing Control Functions 1800. DAS data (upper and lower) may be examined directly for (interferometric) self-noise at desired locations. Both of these “noise” terms may be normalized to defined bandwidths and given respective weightings by algorithms implemented in Control Functions 1800. Another form of calibrating Raman Pumps may be to configure the Raman pumps such that the intensity of the DAS/DTS backscattered light returning from the distal end of downhole sensing fiber 710 is maximized. This data combined with the signal strength monitors may be processed in Control Functions 1800 to control the Raman pumps and transmitted signal pulse power for optimal system performance. Signal strength monitors may house optics like e.g., Wavelength Division Multiplexers (WDMs) where signals may be split into different wavelength bands thus enabling individual laser wavelength monitoring where each wavelength may be coupled to individual photo-detectors and associated analog-to-digital signal conversion and communication with Control Functions 1800. Pilot tones via AM (amplitude modulation) or Angle modulation (frequency or phase modulation) of the pump light may be injected to enable more precise Phase locked Loop (PLL) control of Raman gain. The systems and methods disclosed herein may comprise any of the various features of the systems and methods disclosed herein, including one or more of the following statements.

Statement 1: A system for downhole measurements. The system may comprise a fiber optic cable that further comprises a transmission fiber and a return fiber. Additionally, the system may comprise a passive optical device optically connected to the transmission fiber and the return fiber, a first wavelength division multiplexer (WDM) optically connected to the transmission fiber, and a second WDM optically connected to the return fiber. The system may further comprise a transmitter and a first Raman pump optically connected to the first WDM and a receiver and a second Raman pump optically connected to the second WDM.

Statement 2. The system of statement 1, further comprising a first signal strength monitoring module optically connected to the transmission fiber through a first signal tap coupler.

Statement 3. The system of statement 2, further comprising a second signal strength monitoring module optically connected to the return fiber through a second signal tap coupler.

Statement 4. The system of any previous statements 1 or 2, further comprising a first set of reflective elements optically connected to a third WDM and a second set of reflective elements optically connected to a fourth WDM, and wherein the first set of reflective elements and the second set of reflective elements are mirrors or Fiber Bragg Gratings.

Statement 5. The system of any previous statements 1, 2, or 4, further comprising a downhole sensing fiber optically connected to the passive optical device.

Statement 6. The system of any previous statements 1, 2, 4, or 5, further comprising an information handling system optically connected to a first Raman Pump, a second Raman Pump, a first signal strength monitoring module, a second signal strength monitoring module, the transmitter, and the receiver.

Statement 7. The system of statement 6, wherein the information handling system controls the first Raman Pump and the Second Raman Pump with a control function, wherein the control function utilizes data from the first signal strength monitoring module, and the second signal strength monitoring module, the transmitter and the receiver as inputs.

Statement 8. The system of any previous statements 1, 2, 4, 5, or 6, wherein the passive optical device comprises a circulator.

Statement 9. The system of any previous statements 1, 2, 4, 5, 6, or 8, wherein the passive optical device comprises a fused type fiber optic splitter or a Planar Waveguide Circuit (PLC) fiber optic splitter.

Statement 10. A system for downhole measurements. The system may comprise a fiber optic cable that comprises a transmission fiber and a return fiber. The system may further comprise a first passive optical device connected to an end of the transmission fiber and an end of the return fiber, a first wavelength division multiplexer (WDM) connected to the opposite end of the transmission fiber, a second WDM optically connected to the opposite end of the return fiber, a first Raman pump optically connected to the first WDM, and a second Raman pump optically connected to the second WDM. The system may further comprise a second passive optical device connected to the first and second WDM and a sensing system connected to the second passive optical device.

Statement 11. The system of statement 10, further comprising a first signal strength monitoring module connected to the first WDM through a first signal tap coupler.

Statement 12. The system of statement 11, further comprising a second signal strength monitoring module connected to the second WDM through a second signal tap coupler.

Statement 13. The system of any previous statements 10 or 11, further comprising a first set of reflective elements connected to a third WDM and a second set of reflective elements connected to a fourth WDM, and wherein the first set of reflective elements and the second set of reflective elements are mirrors or Fiber Bragg Gratings.

Statement 14. The system of any previous statements 10, 11, or 13, further comprising a downhole sensing fiber connected to the second passive optical device.

Statement 15. The system of any previous statements 10, 11, 13, or 14, further comprising a first set of dissipative elements connected to a third WDM, a second set of dissipative elements connected to a fourth WDM, and wherein the dissipative elements are a coreless termination fiber or a fiber end cap.

Statement 16. The system of any previous statements 10, 11, or 13-15, wherein the first passive optical device and the second passive optical device each individually comprise a circulator.

Statement 17. The system of any previous statements 10, 11, or 13-16, wherein the first passive optical device and the second passive optical device each individually comprise a fused type fiber optic splitter or a Planar Waveguide Circuit (PLC) fiber optic splitter.

Statement 18. A system for downhole measurements. The system may comprise a fiber optic cable that may comprise a transmission fiber and a return fiber. The system may further comprise at least two wavelength division multiplexer (WDM) optically connected to the transmission fiber and the return fiber and one or more sensing systems optically connected to one of the at least two WDM.

Statement 19. The system of statement 18, wherein the one or more sensing systems utilize a Rayleigh scattering measurement, a Brillouin scatter measurement, or a Raman scattering measurement.

Statement 20. The system of statement 18, further comprising one or more raman pumps connected to at least one of the at least two WDM.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any comprised range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system comprising:

a fiber optic cable configured to receive an optical signal comprising:
a transmission fiber; and
a return fiber optically connected to the transmission fiber at a first end;

a circulator optically connected to the transmission fiber and the return fiber at the first end;

an interrogator disposed up fiber of the circulator;

a first wavelength division multiplexer (WDM) optically connected to the transmission fiber;

a second WDM optically connected to the return fiber;

a first Raman pump optically connected to the first WDM;

a second Raman pump optically connected to the second WDM;

a first signal strength monitoring module disposed down fiber of the interrogator and configured to convert optical energy of the optical signal into one or more electrical signals, wherein the first signal strength monitoring module is optically connected to the transmission fiber through a first signal tap coupler, and wherein the first signal tap coupler is optically connected to the transmission fiber and is configured to:
receive a backscattered portion of the optical signal as the backscattered portion of the optical signal travels along an optical path of the transmission fiber;
split the backscattered portion of the optical signal into two or more portions; and
divert at least one portion of the two or more portions from the optical path of the transmission fiber to the first signal strength monitoring module, wherein at least one other portion of the two or more portions remains on the optical path of the transmission fiber;

a second signal strength monitoring module disposed down fiber of the interrogator and configured to convert optical energy of a return signal into one or more electrical signals, wherein the second signal strength monitoring module is optically connected to the return fiber through a second signal tap coupler, wherein the second signal tap coupler is optically connected to the return fiber and is configured to:
receive the return signal as the return signal travels alone an optical path of the return fiber;
split the return signal into two or more portions; and
divert at least one portion of the two or more portions from the optical path of the return fiber to the second signal strength monitoring module, wherein at least one other portion of the two or more portions remains on the optical path of the return fiber;

a control function communicatively coupled to the first signal strength monitoring module, the second signal strength monitoring module, the first Raman pump, and the second Raman pump and configured to:
optimize one or more signal properties of the optical signal as the optical signal travels along the transmission fiber by:
generating, via a signal generator communicatively coupled to the system, one or more test signals at varying pulse power levels;
for each test signal of the one or more test signals, varying a pump power level of the first Raman pump such that each test signal of the one of more test signals corresponds to a respective pulse power level and a respective pump power level;
receive a signal-to-noise ratio (SNR) measurement, a signal strength, or both for each test signal of the one or more test signals;
determine an optimal pump power level and an optimal pulse power level based at least on the SNR measurement, the signal strength, or both for each test signal of the one or more test signals; and
control at least the first Raman pump to operate at the optimal pump power level; and
optimize one or more signal properties of the return signal as the return signal travels along the return fiber by:
varying a pump power level of the second Raman pump between a minimum pump power level and a maximum pump power level;
for each pump power level between the minimum pump power level and the maximum pump power level, process, in real-time, one or more electrical signals associated with the return signal to determine one or more signal quality metrics; and
based at least on the one or more signal quality metrics determined for each pump power level between the minimum pump power level and the maximum pump power level, control at least the second Raman pump to operate at an optimal pump power level of the second Raman pump;

wherein the first signal strength monitoring module monitors a back scattered Rayleigh signal strength of a transmitted pulse on the transmission fiber, the control function being responsive to the back scattered Rayleigh signal strength to control power to the first Raman pump to maximize Rayleigh signal pulse power on the transmission fiber;

and wherein the second signal strength monitoring module monitors the return signal on the return fiber, the control function being responsive to the return signal on the return fiber to control power of the second Raman pump to maximize an optical signal-to-noise ratio of the return signal on the return fiber.

2. The system of claim 1, further comprising:

a second control function communicatively coupled to the second signal strength monitoring module and to the second Raman pump, the second control function utilizing data from the second signal strength monitoring module to control output from the second Raman pump.

3. The system of claim 1, further comprising a first set of reflective elements optically connected to a third WDM optically connected to and disposed on the transmission fiber and a second set of reflective elements optically connected to a fourth WDM optically connected to and disposed on the return fiber, and wherein the first set of reflective elements and the second set of reflective elements are mirrors or Fiber Bragg Gratings.

4. The system of claim 1, further comprising a downhole sensing fiber optically connected to a passive optical device, wherein the passive optical device is optically connected to the transmission fiber at a second end.

5. The system of claim 1, further comprising an information handling system optically connected to the first Raman Pump, the second Raman Pump, the first signal strength monitoring module, a second signal strength monitoring module, a transmitter, and a receiver.

6. The system of claim 4, wherein the passive optical device comprises a circulator.

7. The system of claim 4, wherein the passive optical device comprises a fused type fiber optic splitter or a Planar Waveguide Circuit (PLC) fiber optic splitter.

8. A system comprising:

a fiber optic cable configured to receive an optical signal comprising:
- a transmission fiber;
- a return fiber; and a circulator optically connected to a first end of the transmission fiber and a first end of the return fiber;

an interrogator disposed up fiber of the circulator;

a first wavelength division multiplexer (WDM) optically connected to a second end of the transmission fiber;

a second WDM optically connected to a second end of the return fiber;

a first Raman pump optically connected to the first WDM;

a second Raman pump optically connected to the second WDM;

one or more downhole sensing fibers optically connected to the circulator;

one or more transmitters optically connected to the first WDM by a first fiber optic cable;

one or more receivers optically connected to the second WDM by a second fiber optic cable;

a first signal strength monitoring module disposed down fiber of the interrogator and configured to convert optical energy of the optical signal into one or more electrical signals, wherein the first signal strength monitoring module is optically connected to the first fiber optic cable through a first signal tap coupler, and wherein the first signal tap coupler is optically connected to the first fiber optic cable after the one or more transmitters and is configured to:

receive a backscattered portion of the optical signal as the backscattered portion of the optical signal travels along an optical path of the transmission fiber;

split the backscattered portion of the optical signal into two or more portions; and divert at least one portion of the two or more portions from the optical path of the transmission fiber to the first signal strength monitoring module, wherein at least one other portion of the two or more portions remains on the optical path of the transmission fiber;

a second signal strength monitoring module disposed down fiber of the interrogator and configured to convert optical energy of a return signal into one or more electrical signals, wherein the second signal strength monitoring module is optically connected to the return fiber through a second signal tap coupler, wherein the second signal tap coupler is optically connected to the return fiber and is configured to:

receive the return signal as the return signal travels along an optical path of the return fiber;

split the return signal into two or more portions; and divert at least one portion of the two or more portions from the optical path of the return fiber to the second signal strength monitoring module, wherein at least one other portion of the two or more portions remains on the optical path of the return fiber;

a control function communicatively coupled to the first signal strength monitoring module, the second signal strength monitoring module, the first Raman pump, and the second Raman pump and configured to:

optimize one or more signal properties of the optical signal as the optical signal travels along the transmission fiber by:

generating, via a signal generator communicatively coupled to the system, one or more test signals at varying pulse power levels;

for each test signal of the one or more test signals, varying a pump power level of the first Raman pump such that each test signal of the one or more fest signals corresponds to a respective pulse power level and a respective pump power level, receive a signal-to-noise ratio (SNR) measurement, a signal strength, or both for each test signal of the one or more test signals, determine an optimal pump power level and an optimal pulse power level based at least on the SNR measurement, the signal strength, or both for each test signal of the one or more test signals; and control at least the first Raman pump to operate at the optimal pump power level; and optimize one or more signal properties of the return signal as the return signal travels along the return fiber by:

varying a pump power level of the second Raman pump between a minimum pump power level and a maximum pump power level, for each pump power level between the minimum pump power level and the maximum pump power level, process, in real-time, one or more electrical signals associated with the return signal to determine one or more signal quality metrics; and based at least on the one or more signal quality metrics determined for each pump power level between the minimum pump power level and the maximum pump power level, control the second Raman pump to operate at an optimal pump power level of the second Raman pump;

wherein the first signal strength monitoring module monitors a back scattered Rayleigh signal strength of a transmitted pulse on the transmission fiber, the control function being responsive to the back scattered Rayleigh signal strength to control power to the first Raman pump to maximize Rayleigh signal pulse power on the transmission fiber;

and wherein the second signal strength monitoring module monitors a back scattered signal strength on the return fiber, the control function being responsive to the back scattered signal on the return fiber to control power to the second Raman pump to maximize an optical signal-to-noise ratio of the back scattered signal on the return fiber.

9. The system of claim 8, further comprising:

a second signal strength monitoring module optically connected to the second fiber optic cable through a second signal tap coupler, wherein the second signal tap coupler is optically connected to the second fiber optic cable between the second WDM and the one or more receivers; and a second control function communicatively coupled to the second signal strength monitoring module and to the second Raman pump, the second control function utilizing data from the second signal strength monitoring module to control power from the second Raman pump.

10. The system of claim 8, further comprising a first set of reflective elements connected to a third WDM optically connected to and disposed on the transmission fiber and a second set of reflective elements connected to a fourth WDM optically connected to and disposed on the return fiber, and wherein the first set of reflective elements and the second set of reflective elements are mirrors or Fiber Bragg Gratings.

11. The system of claim 8, further comprising a first set of dissipative elements connected to a third WDM optically connected to and disposed on the transmission fiber, a second set of dissipative elements connected to a fourth WDM optically connected to and disposed on the return fiber, and wherein the dissipative elements are a coreless termination fiber or a fiber end cap.

12. The system of claim 1, wherein the signal generator is configurable to apply a dynamic voltage signal to the transmitter wherein the transmitter transmits a phase modulation directly proportional to the dynamic voltage signal.

13. The system of claim 1, wherein the back scattered signal strength on the return fiber comprises a backscattered Rayleigh signal strength.

14. The system of claim 8, wherein the back scattered signal strength on the return fiber comprises a backscattered Rayleigh signal strength.

* * * * *